US011369015B2

(12) United States Patent
Thompson et al.

(10) Patent No.: US 11,369,015 B2
(45) Date of Patent: Jun. 21, 2022

(54) VARIABLE POWER SUPPLY SECURITY LIGHT WITH CONNECTION PRIORITY

(71) Applicant: HeathCo LLC, Bowling Green, KY (US)

(72) Inventors: Stephen Brett Thompson, Peachtree Corners, GA (US); Apollo Paul Paredes, Livonia, MI (US); Lionel V. Luu, Bowling Green, KY (US); John Colvin Deaton, Bowling Green, KY (US); Scott Blaise Tylicki, Bowling Green, KY (US)

(73) Assignee: HEATHCO LLC, Bowling Green, KY (US)

( * ) Notice: Subject to any disclaimer, the term of this patent is extended or adjusted under 35 U.S.C. 154(b) by 0 days.

(21) Appl. No.: 17/211,008

(22) Filed: Mar. 24, 2021

(65) Prior Publication Data

US 2022/0086990 A1 Mar. 17, 2022

Related U.S. Application Data

(60) Provisional application No. 63/077,848, filed on Sep. 14, 2020.

(51) Int. Cl.
*H05B 47/115* (2020.01)
*H05B 45/10* (2020.01)

(52) U.S. Cl.
CPC ........... *H05B 47/115* (2020.01); *H05B 45/10* (2020.01)

(58) Field of Classification Search
CPC ..... F21K 9/20; F21S 2/005; F21S 4/28; F21S 9/02; F21S 9/04; F21S 45/42; F21S 8/003; F21S 9/032; F21S 9/037; H05B 47/115; H05B 47/19; H05B 47/11; H05B 45/10; H05B 47/185; H05B 39/086; H05B 39/088; H05B 45/18; H05B 45/20; H05B 47/175; H05B 47/26; H05B 47/105; H05B 47/18; H05B 45/12; H05B 45/37; H05B 45/385; H05B 45/50; H05B 47/10; H05B 47/12;
(Continued)

(56) References Cited

U.S. PATENT DOCUMENTS 5,148,158 A 9/1992 Shah
7,641,366 B1 1/2010 Sibalich et al.
(Continued)

OTHER PUBLICATIONS

Vieira, Jose Antonio Barros and Alexandre Manuel Mota, A High-Performance Stand-Alone Solar PV Power System for LED Lighting, Hindawi Publishing Corporation, ISRN Renewable Energy, vol. 2013, 2013 10 pages.

*Primary Examiner* — Monica C King
(74) *Attorney, Agent, or Firm* — Middleton Reutlinger

(57) ABSTRACT

A security light having optional and prioritized connection to multiple power supplies. The lighting controller can sense the appropriate connected supply and automatically connect to three different power supplies which include house voltage connection through a typical junction box, a remote solar charging station, and on board batteries that can be used as a third backup power supply. Additional implementations include prioritizing the connection to the plurality of electrical supplies and selecting one of the electrical supplies based upon a stored connection priority list or associated circuitry as well as including associated lighting characteristics for the prioritized selection.

30 Claims, 15 Drawing Sheets

(58) Field of Classification Search
CPC ...... H05B 47/155; H05B 47/16; H05B 39/08;
H05B 45/22; H05B 45/325; H05B
45/355; H05B 45/357; H05B 45/3725;
H05B 45/395; H05B 47/13; G09G 3/22;
H02J 50/12; H02J 7/025; H02J 50/70;
H02J 50/90; H02J 50/60; H02J 50/50;
H02J 50/80; H02J 5/005; H02J 50/40;
H02J 7/35; H02J 7/00304; H02J 7/00034;
H02J 7/0047; H02J 50/005; H02J 50/402;
H02J 50/20; H02J 7/00; H02J 7/0029;
H02J 2310/40; H02J 7/04; H02J 7/045;
H02J 2300/28; H02J 7/00045; H02J 7/34;
H02J 50/05; H02J 7/00309; H02J 50/502;
H02J 50/10; H02J 2310/48; H02J 50/30;
H02J 3/14; H02J 50/15; H02J 7/0048;
H02J 7/007182; H02J 7/00714; H02J
3/322; H02J 7/0027; H02J 7/0042; H02J
7/0044; H02J 2207/40; H02J 2300/24;
H02J 3/32; H02J 3/383; H02J 50/23
See application file for complete search history.

(56) References Cited

U.S. PATENT DOCUMENTS

| | | | |
|---|---|---|---|
| 8,588,830 | B2 | 11/2013 | Myer et al. |
| 9,408,268 | B2 | 8/2016 | Recker et al. |
| 9,839,088 | B1 | 12/2017 | Deaton |
| 9,907,147 | B2 * | 2/2018 | Chen ............... F21V 14/06 |
| 9,970,611 | B2 | 5/2018 | Toner |
| 10,028,351 | B2 | 7/2018 | Chen |
| 10,082,257 | B1 | 9/2018 | Beranek |
| 10,094,525 | B2 | 10/2018 | Kaag |
| 10,139,846 | B2 | 11/2018 | Motsenbocker |
| 10,178,745 | B2 | 1/2019 | Hall et al. |
| 10,321,547 | B1 | 6/2019 | Recker et al. |
| 10,718,500 | B1 | 7/2020 | Tylicki et al. |
| 11,231,152 | B1 * | 1/2022 | Thompson ............ F21S 9/032 |
| 2015/0330587 | A1 | 11/2015 | Lax et al. |
| 2018/0195703 | A1 | 7/2018 | Bailey et al. |
| 2019/0098723 | A1 * | 3/2019 | Sadwick ............ F21K 9/272 |
| 2019/0113220 | A1 | 4/2019 | Haase et al. |
| 2019/0211985 | A1 | 7/2019 | Wijaya et al. |

* cited by examiner

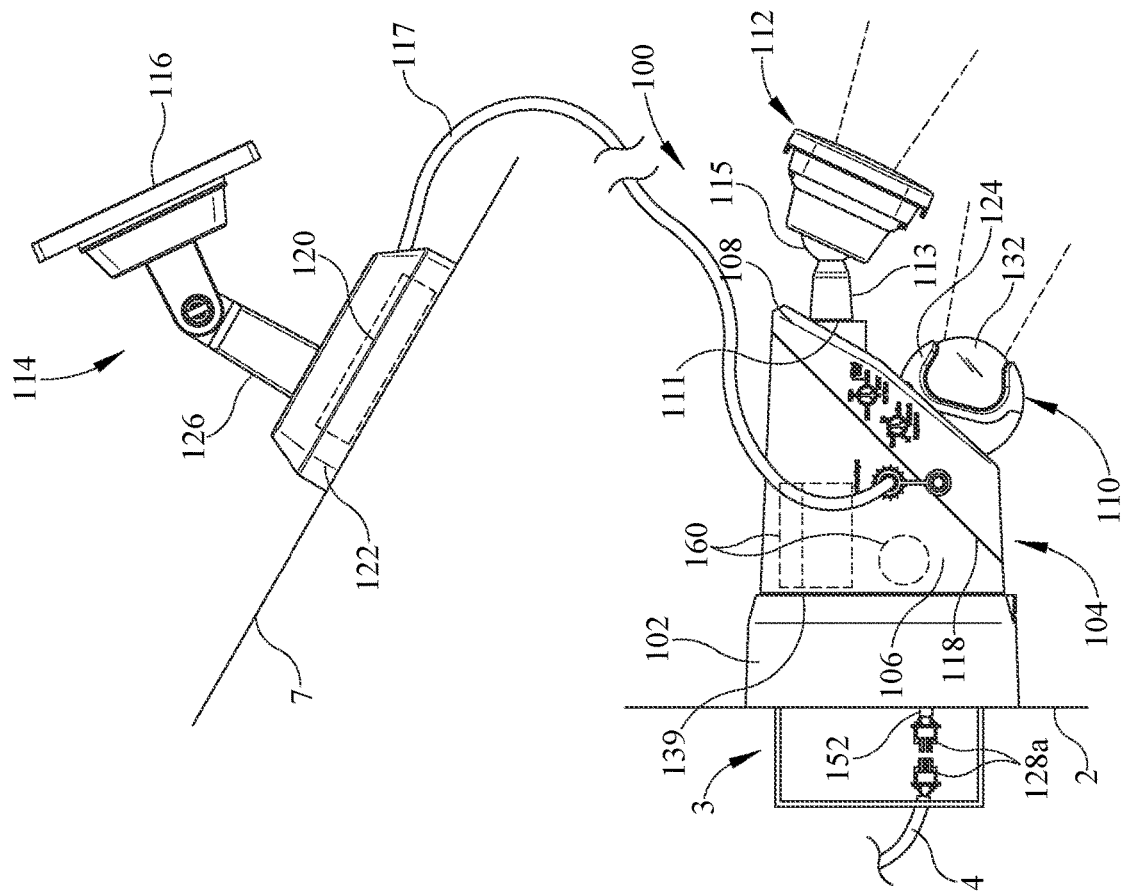
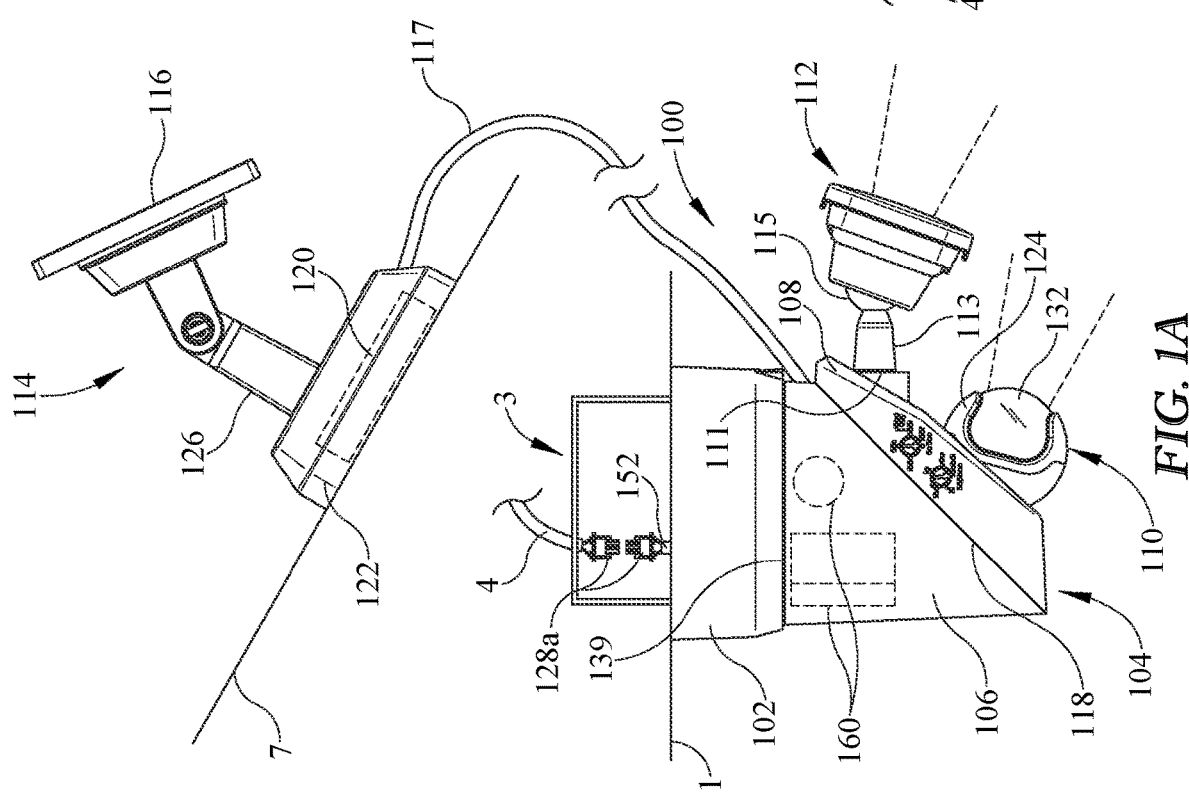

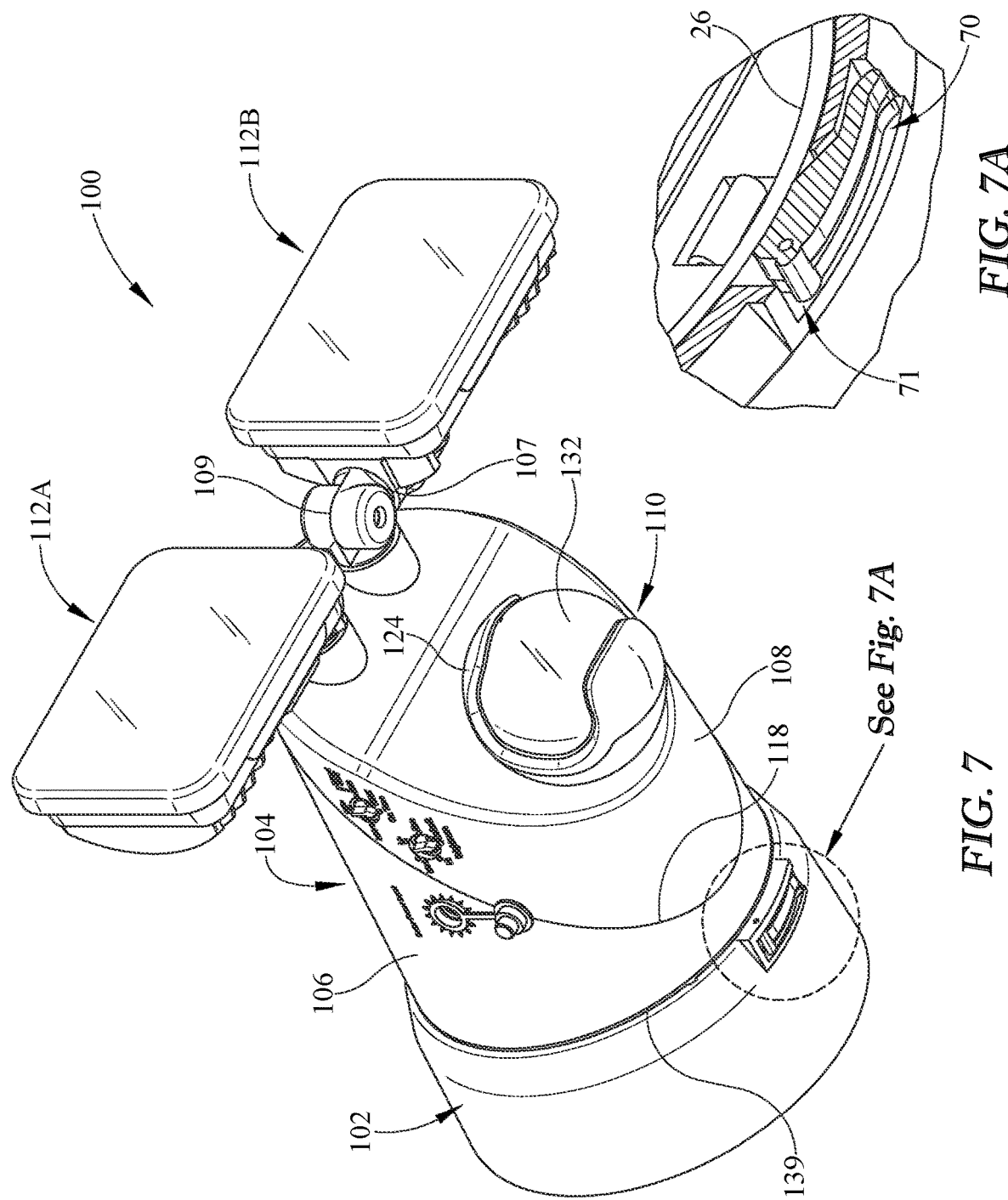

| Electrical Connectivity Priority List | | | | |
| --- | --- | --- | --- | --- |
| Priority Electrical Connection | Output Illumination Level for Motion | Output Illumination Level for Non-Motion | Motion On Timer Predetermined Value | Other Values Associated with Electrical Input |
| Electrical Input 1 | | | | |
| Electrical Input 2 | | | | |
| Electrical Input 3 | | | | |

FIG 12

VARIABLE POWER SUPPLY SECURITY LIGHT WITH CONNECTION PRIORITY

BACKGROUND

The present disclosure covers an outdoor security light which provides variable connectivity to multiple power supplies and also includes connection priority. Increasing power supply connectivity of the security light allows flexibility related to installation location, connectivity in remote locations as well as user control of power supply selection.

SUMMARY

The present disclosure sets forth an outdoor security light which has a plurality of electrical connections including a direct connection to the house or line voltage, a remote photovoltaic cell rechargeable battery system and an internal replaceable backup battery power supply. The security light includes an illumination controller which controls the electrical connectivity between the electrical source and the load of the lamp heads and selects the appropriate preferential electrical connection based upon a priority list of connections. The priority connection list also includes corresponding associated illumination characteristics with preferential motion sensed illumination characteristics, among other aspects.

In many security light installations, ready availability to an electrical connection is not present. Thus, the present disclosure provides a maximum amount of electrical variability for powering the illumination sources, the plurality of LEDs located within the lamp head of the security light. In various implementations, the outdoor security light with optional electrical connections allows the security light to be connected to house current/line voltage, a photovoltaic cell which charges a rechargeable battery, and an internal battery pack.

For example, in some installations, the security light may be connectable to all three power sources. A first electrical supply input may be connectable to standard line voltage from a house junction box. A second electrical supply input may be connected to a remote solar charging station having photovoltaic cells for charging a rechargeable battery and which is removably wired to the luminaire housing. A third electrical supply input may be connected to an internal battery pack containing at least one replaceable backup battery.

By providing three alternative power sources to power the LEDs of the security light and associated electronics, installation variability is provided along with the ability for the user to switch from one power source to the other based upon prioritized connection parameters as well as associated lighting characteristics.

For example, the security light could power the LEDs utilizing the remote solar cell charging system battery on most occasions until the remote solar charging station rechargeable battery is drained. Upon the detection of a low battery condition at the rechargeable battery, the illumination controller could be set to automatically switch to the house current or the internal battery pack as a backup electrical source. In such use the security light may provide significant savings to the user by relying on reusable energy in most instances. Further, such a security light electrical connection provides for systematic backup when relying primarily on the remote solar charging station system battery, such as for example during heavy motion detection at night where the lamps are illuminated at high intensity thereby quickly draining the rechargeable batteries.

In further embodiments, the illumination controller may receive user input to over-ride the settings for selection of the power supply.

In some embodiments, the security light can be installed in two sections with a separate housing mount which electrically connects to the house line voltage to provide standard AC electrical current to the luminaire. The housing mount can modify the received electricity to low voltage direct current for ease of connection between the housing mount and the luminaire housing. For example, the housing mount can have appropriate electronics to provide both AC to DC converters and voltage regulators. For example, the housing mount can modify the incoming 120V AC to low voltage DC provided through an interface between the housing mount and the luminaire housing.

In still further embodiments the housing mount can include electrical contacts for conveying the converted low voltage DC electrical power to the luminaire housing. For example, the housing mount can include a set of pluggable contacts. In even further variations, the housing mount can include rotational electrical contacts. In such examples, the housing mount can have a mounting plate with at least a first and second concentric contact ring for electrical connection to the luminaire housing with low voltage DC.

In some implementations, the luminaire housing can include a first portion and a second portion, the first portion having matching electrical contacts to receive low voltage DC electricity from the housing mount. In some embodiments, these contacts can be matched for pluggable connectivity while in still further variations these contacts can include electrical contacts which rotationally match contacts positioned on the surface of the housing mount. For example, in some instance, the first portion of the luminaire housing could have a plug which mates with a similar plug in the mounting plate. Alternatively, in examples, the luminaire first portion could have first and second outwardly extending contacts which may be biased against rotationally positioned electrical contacts on the mounting plate, or vice versa.

For example, the housing mount can have an electrical contact plate with exposed rotational contacts or other electrical connections, the luminaire housing first portion having mating outwardly extending contacts or plugs which maintain contact during rotation of the luminaire housing first portion relative to the housing mount.

In some examples, a locking mechanism may be implemented on the collar to retain the luminaire to the housing mounting. In still further examples, the luminaire housing could be retained in the housing mount through friction or rotational threads.

The present disclosure sets forth a method for controlling an outdoor security light connected to multiple electrical sources, including a luminaire housing having at least one luminaire lamp head adjustably connected to the luminaire housing, the at least one luminaire lamp head having a plurality of illumination sources. The illumination controller is electrically connected to a first electrical supply input, a second electrical supply input and a third electrical supply input and is further operable to detect an electrical characteristic at each of the first electrical supply input, second electrical supply input and third electrical supply input. The illumination controller is operable to control at least one illumination characteristic of the luminaire lamp head plurality of illumination sources, the light also including a motion detection sensor electrically connected to the illumination controller. The illumination controller is connected to an associated memory, the associated memory storing an electrical connectivity priority list which is accessible by the illumination controller and which contains at least a first, second and third priority electrical connection between the first electrical supply input, second electrical supply input and the third electrical supply input. For each of the first, second and third priority electrical connection, the memory further has an associated light output illumination level for detected motion from the motion detection sensor. The method further includes detecting by the illumination controller the electrical characteristic from at least one of the first electrical supply input, second electrical supply input and third electrical supply input. The method further selects, by the illumination controller, one of the first electrical supply input, second electrical supply input and third electrical supply input based upon: the detected characteristic of at least one of the first electrical supply input, second electrical supply input and third electrical supply input, and the electrical connectivity priority list. The method also includes selectively connecting by the illumination controller the motion detecting sensor to the selected one of the plurality of the first electrical supply input, second electrical supply input and third electrical supply input based upon: detecting by the motion detecting sensor a motion signal. The method finally also includes illuminating by the illumination controller the plurality of illumination sources of the at least one luminaire lamp head by the selected one of the plurality of the first electrical supply input, second electrical supply input and third electrical supply input at the associated light output illumination level for the selected electrical supply input.

These implementations may include at least one or more of the following features.

In some implementations, the detecting by the illumination controller the electrical characteristic from at least one of the first electrical supply input, second electrical supply input and third electrical supply input detects at least one of voltage and current. In some of these implementations, the detecting by the illumination controller the electrical characteristic from at least one of the first electrical supply input, second electrical supply input and third electrical supply input, includes, among other features, detecting each of the first electrical supply input, second electrical supply input and third electrical supply input in a predetermined electrical selectivity order; determining if detected first electrical supply input, second electrical supply input and third electrical supply input meets a predetermined threshold; discontinuing the detecting once one of the detected first electrical supply input, second electrical supply input and third electrical supply input meets a predetermined threshold. In addition, in some of these implementations, the method may further include discontinuing the illuminating by the illumination controller of the at least one luminaire lamp head after a predetermined time period. Further aspects may additionally include setting the predetermined time period for illuminating of the at least one luminaire lamp head so that it is associated with the associated light output illumination level.

The present disclosure further describes a method of controlling an outdoor security light, including sensing, by an illumination controller, an electrical characteristic at a first electrical source input, a second electrical source input and a third electrical source input. The method further includes, based upon the sensed electrical characteristic, connecting one of the first electrical source input, the second electrical source input and the third electrical source input, to a plurality of LEDs in at least one lamp head of the security light. In such implementations, the first electrical source input is electrically connected to a line voltage input, the second electrical source input is connected to a remote solar charging station having a rechargeable battery, and the third electrical source input is electrically connected to a local battery source. As well, the connecting of one of the first electrical source input, the second electrical source input and the third electrical source input, to a plurality of LEDs in at least one lamp head of the security light is based upon an electrical connectivity priority list stored in memory associated with the outdoor security light.

These implementations may include at least one or more of the following features.

In some implementations, the method may further include prioritizing the connecting to the plurality of LEDs. In some of these implementations, the prioritizing the connecting further includes: connecting the first electrical source to the plurality of LEDs when the sensed first voltage is at least a predetermined minimum voltage. In still further implementations, when the sensed first voltage is not at least a predetermined minimum voltage, determining if the sensed second voltage is at least a second predetermined voltage; when the sensed second voltage is at least a second predetermined voltage, connecting the second electrical source input to the plurality of LEDs. Further implementations may include that when the sensed second voltage is not at least a second predetermined minimum voltage, determining if the sensed third voltage is at least a third predetermined voltage; when the sensed third voltage is at least a third predetermined voltage, connecting the third electrical source input to the plurality of LEDs. Still further implementations may optionally include setting a predetermined intensity for the plurality of LEDs based on the prioritizing the connecting.

Further aspects of the present disclosure sets forth a method of controlling an outdoor security light, including providing a first electrical source input, a second electrical source input and a third electrical source input in the outdoor security light. In aspects, the first electrical source input is electrically connectable to a line voltage input, the second electrical source input is connectable to a remote solar charging station having a rechargeable battery, and the third electrical source input is electrically connected to a local battery source. The method includes sensing an electrical characteristic at a first electrical source input, a second electrical source input and a third electrical source input and then determining a connection priority between the first electrical source input, the second electrical source input and the third electrical source input. The method further includes connecting one of the first electrical source input, the second electrical source input and the third electrical source input, to a plurality of LEDs in at least one lamp head of the security light based upon the determined priority of connections.

In other implementations, the present disclosure describes an outdoor security light with multiple power sources and which includes a luminaire housing having at least one luminaire lamp head, the at least one luminaire lamp head adjustably connected to the luminaire housing, the at least one luminaire lamp head having a plurality of LEDs. The light further includes an illumination controller electrically connected to a first electrical supply input, a second electrical supply input and a third electrical supply input and operable to detect an electrical characteristic at each of the first electrical supply input, second electrical supply input and third electrical supply input. Further, the illumination controller is operable to control at least one illumination characteristic of the luminaire lamp head plurality of LEDs. The apparatus further includes that the first electrical supply input connected to a line voltage power line, the second electrical supply input connected to a rechargeable battery connected to a photovoltaic cell and the third electrical supply input connected to at least one replaceable backup battery system retained within the luminaire housing.

In such implementation, the illumination controller connected to an associated memory, the associated memory storing an electrical connectivity priority list which is accessible by the illumination controller and which contains at least a first, second and third priority electrical connection between the first electrical supply input, second electrical supply input and the third electrical supply input. For each of the first, second and third priority electrical connection, the list includes an associated light output illumination level for motion. The controller is further operable to select a selected electrical input to connect to the plurality of LEDs of the at least one luminaire lamp head, one of the first electrical supply input, second electrical supply input and third electrical supply input. Such selection is based upon the detected characteristic of at least one of the first electrical supply input, second electrical supply input and third electrical supply input, and the electrical connectivity priority list. Additionally, the controller, upon receipt of a motion detect signal, is operative to selectively connect the selected electrical input selected from the first electrical supply input, the second electrical supply input and the third electrical supply input, to the plurality of LEDs of the at least one luminaire lamp head. The controller further adjust the illumination level of the plurality of LEDs of the at least one luminaire lamp head to the associated light output illumination level for motion stored in the electrical connectivity priority list.

These implementations may include at least one or more of the following features.

In some implementations, the security light may have an electrical connectivity priority list which is stored in associated memory accessible to the illumination controller within the outdoor security light. In still further implementations, a remote server may be included which is in electronic communication with the illumination controller of the outdoor security light, wherein the electrical connectivity priority list is communicated to the illumination controller from a remote server. In even further examples, the electrical connectivity priority list may further include for each of the first, second and third priority electrical connection, an associated light output illumination level for: non-motion and a motion on-duration value representing a time amount the at least one luminaire lamp head is illuminated upon detection of motion.

Some implementations may include the security light having user input panel, the user input panel providing an over-ride selection for illumination intensity, the over-ride selection for illumination intensity read by the illumination controller and replacing at least one of the first, second and third priority electrical connections associated light output illumination level for motion.

In still further such examples, the security light utilizes an illumination controller, after selectively connecting the plurality of LEDs of the at least one luminaire lamp head to one of the electrical supply inputs, is operable to continue to detect the detected characteristic of at least one of the electrical supply inputs.

Other such implementations may also utilize an illumination controller, after selectively connecting the plurality of LEDs of the at least one luminaire lamp head to one of the electrical supply inputs, continues to detect the detected characteristic of each of the electrical supply inputs.

In such implementations, the illumination controller may optionally be configured to selectively disconnect and re-connect the plurality of LEDs of the at least one luminaire lamp head to one of the electrical supply inputs based upon: the detected characteristic of at least one of the electrical supply inputs and the electrical connectivity priority list. Other options include the illumination controller's selective re-connection of the at least one luminaire lamp head including modification of the associated light output illumination level for motion associated with the selected electrical supply.

In some implementations, the detected electrical characteristic is voltage. In such implementations, the illumination controller may be connected to at least one switch operable to connect the plurality of LEDs of the at least one luminaire lamp head to one of the first electrical supply input, second electrical supply input and third electrical supply input.

The present disclosure also sets forth an outdoor security light with multiple power sources, the security light including a luminaire housing having at least one luminaire lamp head adjustably connected to the luminaire housing, the at least one lamp head having a plurality of LEDs. The security light can have an illumination controller electrically connected to a first electrical supply input, a second electrical supply input and a third electrical supply input and operable to detect electricity as well as an electrical characteristic supplied at each of the first electrical supply input, second electrical supply input and third electrical supply input.

For example, the illumination controller can be an MCU or other microprocessor capable of receiving various inputs and providing multiple outputs. The controller may have access to memory where stored instructions are included for controlling the operation of the security light corresponding to the various features and functions set forth herein.

Further, the illumination controller is operable to selectively connect the plurality of LEDs of the at least one lamp head to one of the first electrical supply input, second electrical supply input and third electrical supply input. For example, the selective connection may be based upon a sensed characteristic of at least one of the first electrical supply input, second electrical supply input and third electrical supply input.

For example, the illumination controller may receive voltage inputs for measurements at each of the electrical supply inputs to determine if electricity is provided at those input. Alternatively, the illumination controller may measure current or other electrical characteristic which indicates connection of an adequate power supply.

In some implementations, the first electrical supply input is connectable to a line voltage power line, the second electrical supply input is connectable to a rechargeable battery connected to a photovoltaic cell and the third electrical supply input is connectable to at least one replaceable backup battery system retained within the luminaire housing.

Further, the third electrical supply may be considered a backup electrical supply and is connected, upon detection of a power failure condition of the first and second power supply, to a backup set of LEDs.

Still further, the luminaire housing of the security light may be removably connectable to a housing mount. The housing mount can supply low voltage electricity to the luminaire housing as the first electrical source input which is converted from a higher line voltage AC source.

These implementations may include at least one or more of the following features.

In some implementations, the outdoor security light may read the sensed characteristic as a voltage. In other implementations, the illumination controller is connected to at least one switch operable to connect the plurality of LEDs of the at least one lamp head to one of the first electrical supply input, second electrical supply input and third electrical supply input.

In still further examples, the illumination controller may be operable to connect the load to mixed power from the first electrical supply input, second electrical supply input and third electrical supply input. In some implementations this may be operable to conserve battery life or reduce dependence on any particular electrical supply input.

In some examples, the outdoor security light may have a rechargeable battery and photovoltaic cell which are integrated with or remote from the luminaire housing and removably connected to the luminaire by a pluggable wire.

In other examples, the outdoor security light may further include a removably attachable power line connecting the rechargeable battery and photovoltaic cell to the luminaire housing. In still others, the entire remote solar charging station may be integrated within the luminaire housing.

In variations, the outdoor security light may have a rechargeable battery which is located in the luminaire housing and is in electrical connectivity with the photovoltaic cell.

In other variations, a voltage regulator circuit may be provided to reduce the voltage of electricity prior to the first electrical supply input.

In still further implementations, the outdoor security light may have an illumination controller which selects the selectable connection to the plurality of LEDs of the first electrical supply input, the second electrical supply input and the third electrical supply input. Further implementations may include a user selection input at the illumination controller, wherein the user selection input over-rides the predetermined electrical source selection.

In other aspects, the outdoor security light has a luminaire housing with a first portion and a second portion, the first portion rotationally connected to the second portion. Still further implementations may include a housing mount, the housing mount removably receiving the luminaire housing first portion.

In alternative implementations, the disclosure herein sets forth an outdoor security light with optional electrical connection having a luminaire housing having at least one adjustable lamp head, the at least one adjustable lamp head having a plurality of LEDs, a first electrical source input, a second electrical source input and a third electrical source input. The first electrical source input is connectable to a line voltage source, the second electrical source input is connectable to a rechargeable battery source, and the third electrical source input is connectable to a backup battery source.

In such implementation, the rechargeable battery source is electrically connected to a photovoltaic cell and is removably electrically connectable to the second electrical source input. Further, an illumination controller may be electrically connected to the first electrical source input, the second electrical source input and the third electrical source input. In such implementation, the illumination controller is operable to connect one of the first electrical source input, the second electrical source input and the third electrical source input, to the plurality of LEDs of the at least one adjustable lamp head. The selective connection between the load of the LEDs and the power supply may be based upon a sensed characteristic of at least one of the first electrical source input, the second electrical source input and the third electrical source input.

In some implementations, the sensed characteristic may be a voltage. In others, the sensed characteristic may be current. In still further implementations the sensed characteristic which indicates the presence of an electrical supply.

In variations, the outdoor security light may include a first switch, a second switch and a third switch wherein each of the first switch, the second switch and the third switch are connected and controlled by the illumination controller. In such implementations, the first switch is between the first electrical source input and the plurality of LEDs, the second switch is between the second electrical source input and the plurality of LEDs, the third switch is between the third electrical source input and the plurality of LEDs. In such variations, the illumination controller is operable to open and close each of the first switch, the second switch and the third switch based upon any of the sensed characteristics.

For example, in such implementations, the first switch, second switch and third switch are each MOSFETs. In others, known switches for opening and closing the circuit to the optionally selected power supply may be utilized and controlled by the illumination controller.

In options, the rechargeable battery and photovoltaic cell are remote from the luminaire housing. Still further options may include a removably attachable power line connecting the rechargeable battery and photovoltaic cell of the remote solar charging station to the luminaire housing.

Some implementations may include a rechargeable battery which is in the luminaire housing and is electrically connected to the photovoltaic cell of the remote solar charging station. Still further variations may include a voltage regulator to reduce the voltage of the electrical connection from the line voltage source and is connected to the first electrical source input. For example, line voltage power supply may be received from the junction box and be adjusted by a voltage and/or current regulator, among some electrical modifications.

In still further implementations, the outdoor security light may have an illumination controller which selects the connection first electrical source input, the second electrical source input and the third electrical source input, to the plurality of LEDs. In such implementations, automatic selection of the connection of the first electrical source input to the plurality of LEDs may be implemented.

Further variations may include a user selection input, wherein a user input interface is included on the housing to select the electrical connection or provided wirelessly through a user interface on a user device which may communicate with the outdoor security light illumination controller. Some communications may be through wireless communications on a peer to peer level. Other communications may be from a server which sends operating instructions to the illumination controller through various communication means.

In still further implementations disclosed herein, a method of controlling an outdoor security light is disclosed which includes sensing, by an illumination controller, an electrical characteristic at a first electrical source input, a second electrical source input and a third electrical source input. Based upon the sensed electrical characteristic, the system may connect one of the first electrical source input, the second electrical source input and the third electrical source input, to a plurality of LEDs in at least one lamp head of the security light. The first electrical source input is electrically connected to a line voltage input, the second electrical source input is connected to a remote solar charging station having a rechargeable battery, and the third electrical source input is electrically connected to a local battery source and act as a backup power supply.

The method further includes sensing of the electrical characteristic which includes at least sensing a first voltage at the first electrical source input. In implementations, the sensing of the electrical characteristic further includes sensing a second voltage at the second electrical source input and sensing a third voltage at a third electrical source input. In still further implementations, the sensing of the electrical characteristic includes detecting at least one of voltage or current. In such implementations, the connecting further includes: connecting the first electrical source to the plurality of LEDs when the sensed first voltage meets a predetermined minimum condition.

In further such implementations, when the sensed first voltage meets a predetermined condition, the method further determines if the sensed second voltage meets a second predetermined condition; when the sensed second voltage meets the second predetermined condition, connecting the second electrical source input to the plurality of LEDs.

Further, the implementations includes that when the sensed second voltage does not meet the second predetermined condition, determining if the sensed third voltage meets a third predetermined condition; when the sensed third voltage meets the third predetermined condition, connecting the third electrical source input to the plurality of LEDs.

In some of these implementations, the method may further include detecting that the sensed electrical characteristic for the first electrical source and the second electrical source meets a predetermined condition. For example, the predetermined condition may be a power outage condition or a low voltage condition. Upon such detection, the system may connect a subset of the plurality of LEDs to the third electrical source input.

In some aspects, meeting the predetermined condition can be sensing or measuring a voltage and determining if the voltage meets a predetermined minimum value. In other implementations, the sensed predetermined condition can be sensing a maximum predetermined condition. Still even further implementations can include meeting a predetermined condition based upon sensing another electrical characteristic such as current or impedance and the predetermined condition can be a predetermined condition indicating that the connected power supply meets a standard viable requirement to energize the LEDs which represent the load.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the disclosure FIG. 1A is a side assembled view of a rotationally adjustable outdoor security light installed on an eave, according to an embodiment of the present disclosure.

FIG. 1B is a side assembled view of a rotationally adjustable outdoor security light installed on a side wall, according to an embodiment of the present disclosure.

FIG. 7 is a perspective view of a rotationally adjustable outdoor security light, according to an embodiment of the present disclosure.

FIG. 7A is an enlarged sectional view of a collar portion of FIG. 7, according to an embodiment of the present disclosure.

FIG. 12 is an exemplary table for an electrical connectivity priority list where multiple power sources are available and the respective associated operating values for the selected electrical connection.

DETAILED DESCRIPTION

Figure 2:
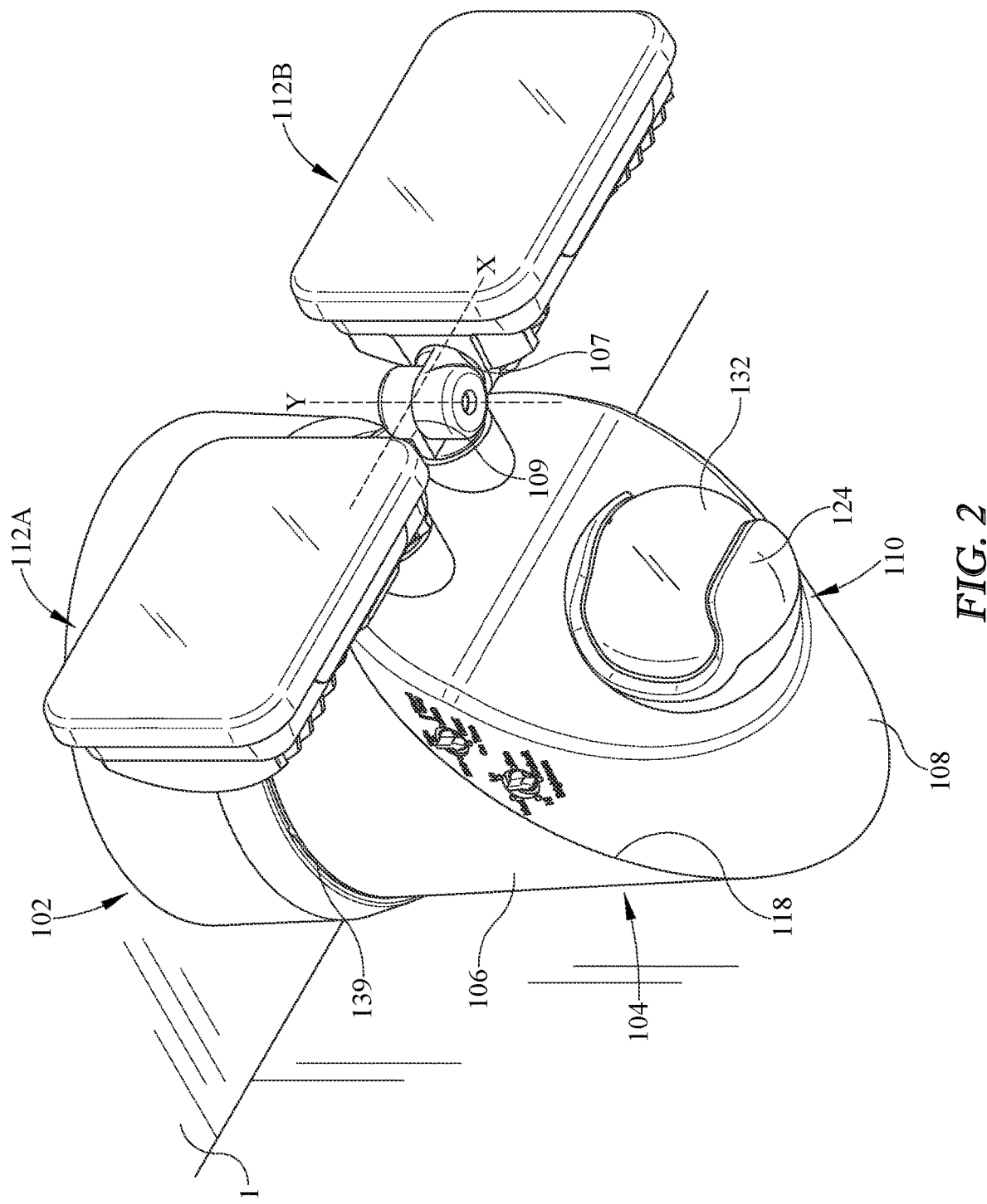
FIG. 2 is a perspective view of FIG. 1A.

As depicted in the drawings, wherein like numbers denote like parts throughout the several views, an adjustable outdoor security light 100 in accordance with various embodiments will be described with reference to the accompanying drawings. The outdoor security light may be mounted in multiple outdoor locations to provide illumination upon detection of an environmental condition. The outdoor security light, due to the location of installation, may be mounted in a plurality of orientations and connected to a plurality of electrical connections. Mounting of the security light 100 may be implemented under various scenarios, and FIGS. 1A and 1B illustrate two typical installations and orientations of the security light 100 to display the overall adjustability with the security light 100. In FIG. 1A the security light 100 is installed under an eave 1 in a horizontal installation and In FIG. 1B the security light 100 is installed on a wall 2 in a vertical orientation against a wall surface. The security light 100 in both orientations is adjustable so as to be forwardly directed to properly illuminate an area when turned on regardless of location of installation while also allowing the motion sensor to adequately view a motion sensing zone. Further, due to the outdoor location and remote installation of the outdoor security light 100, multiple sources of electrical connectivity may be provided. The outdoor security light may selectively connect to the multiple electrical connections based upon a predetermined priority and also illuminate the lamp head illumination sources at associated illumination levels or characteristics based upon the selected electrical connection. Combining both variability of installation as well as variability of electrical connections increases the ease of installation and use of the outdoor security light.

To allow the security light 100 to be mounted in multiple configurations, as best shown in FIGS. 1A and 1B, the security light 100 includes a separated housing mount 102 and luminaire housing 104, which may be removably coupled to each other. Separation of the housing mount 102 and the luminaire housing 104 improves the installation process of the security light 100 and increases variability of installation locations. Turning to FIGS. 1A and 1B, direct mounting of a typical wall mount as depicted in FIG. 1B to an eave mount would not allow both the lamp head(s) and sensors to be properly oriented towards an illumination zone and detection zone. Particularly, by simply reorienting the luminaire housing flat against the ceiling/eave, the sensor would not be oriented appropriately for detection of movement. Also, the lamp heads may be limited in their adjustability due to low clearance of the ceiling structure. However, providing both a separated housing mount in combination with a rotatable first and second portion 108/106 of a removable security light luminaire housing 104 alleviates such shortcomings.

Typical installation of the security light 100 set forth herein includes initial installation of the housing mount 102 which is electrically connected to an electrical connection 4 within a junction box 3 in some implementations. Separately, the security light luminaire housing 104 is removably attached to the housing mount 102. The luminaire housing 104 also has both a first portion 106 and a second portion 108, which are rotatable relative to each other, allowing for adjustability as depicted in FIGS. 1A and 1B. Separate installation of the housing mount 102 to the fixed structure increases the ease of electrical connection and fixating its position. Further, the housing mount 102 may provide additional and separated functionality, such as modification of the electricity provided by the wired housing/structure to an adjusted low voltage DC. Hence, the housing mount 102 may provide direct and easy mechanical and electrical connection of the luminaire housing 104 once the initial housing mount 102 is installed. Further, the luminaire housing may be rotatably adjusted for proper clearance and aiming of both the motion sensor(s) and lamp head(s). Hence, separating the housing mount 102 from the rotatably adjustable security luminaire housing 104 improves both mechanical installation, electrical connectivity and illumination of the illumination zone.

The security light housing 104 includes a rotational connection 118 between first portion 106 and second portion 108. This rotational connection allows rotational adjustment between the two portions In embodiments, the second portion 108 may be connected to the first portion 106 via a rotatable connection that is angularly displaced between the two portions. As shown in FIGS. 1A and 1B, the luminaire housing 104 may include the luminaire housing first portion 106 and the luminaire housing second portion 108 which are rotatably secured together. For mounting purposes, the first portion 106 may be removably attached to the housing mount 102, and the second portion 108 is rotatable relative to the first portion 106. For example, a user can rotate the second portion 108 180 degrees relative to the first portion 106 to switch the security light 100 from a horizontal mounting surface as shown in FIG. 1A to a vertical mounting surface orientation as shown in FIG. 1B. Including the separated housing mount 102 and luminaire housing 104 increases the ease of installation of the wired electrical connection to the housing mount 102 while allowing separate installation of the luminaire housing 104 directly to a mounting structure containing electrical contacts. Thus, no additional wiring is necessary. Rotatable luminaire housing portions 106 and 108 further allow orientation modifications for redirection of the lamp heads and motion sensors.

The rotatable connections allow rotation of the second portion 108 relative to the first portion 106 so that a user may direct the motion sensor 110 and the light head toward desired locations. For example, the rotational interface between the first portion and the second portion may be along an angled rotational surface or interface 118. In such embodiments, the angled rotational surface or interface 118 is angled relative to a rear mounting plane 139 of the first portion 106. The angled rotational surface 118 between the first portion and the second portion allows the security light apparatus 100 disclosed to be mounted on different surfaces, horizontal or vertical, while allowing the lamp heads and sensor heads to be properly directed outwards toward the illumination and the sensor/detection zone.

Electrical connectivity of the security light 100 may be implemented under various scenarios, and FIGS. 1A and 1B illustrate two typical installations and orientations of the security light 100 to display the overall installation position adjustability while also allowing multiple electrical connections be made to the security light. In FIG. 1A the security light 100 is installed under an eave 1 in a horizontal installation and In FIG. 1B the security light 100 is installed on a wall 2 in a vertical orientation against a wall surface. In both installations, the security light 100 may be attached to the house voltage line 4 at the junction box 3. The security light may also include an additional electrical connection using the remote solar charging station 114 which can be positioned remotely from the luminaire. Further, the security light 100 can include internal batteries 160 to provide backup electrical connection when needed.

In various implementations, the security light 100 may include selective prioritization of electrical connectivity to the multiple power supplies. For example, the security light may be connected to up to three or more electrical connections. In the examples depicted, the security light 100 may be connected to a junction box 3, a remote solar charging station 114, as well as internal batteries 160. In some implementations, the internal batteries may act as a battery backup when other electrical connections become unavailable. The luminaire may also provide prioritization of the electrical connectivity to each of the connected power supplies. For example, the outdoor security light may include an electrical connectivity priority list allowing the security light to connect to a particular electrical source but also provide associated operating values for the selected power supply.

Figure 8:
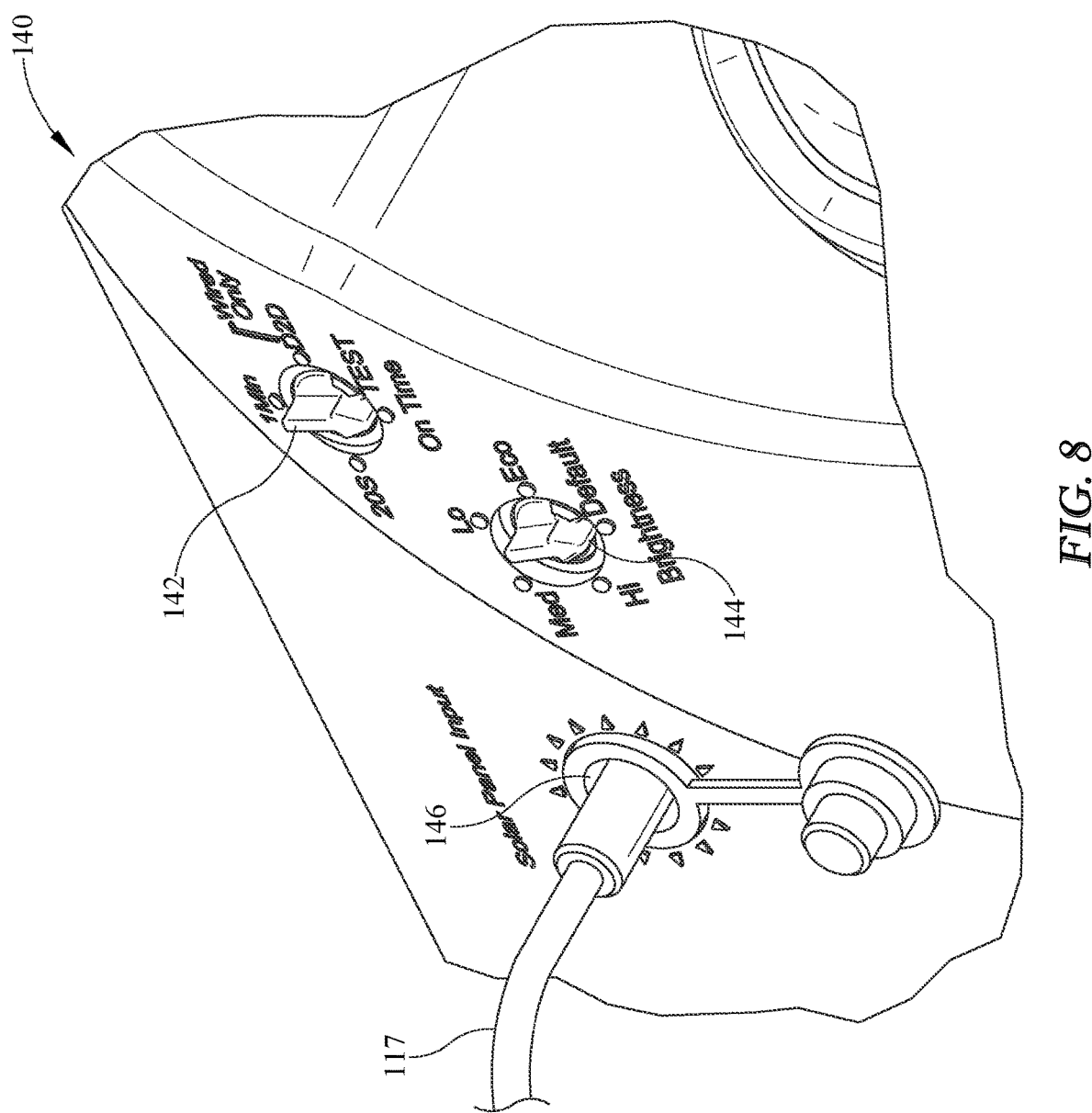
FIG. 8 is an enlarged side perspective view of a control panel user input of FIG. 7, according to an embodiment of the present disclosure.
Figure 9:
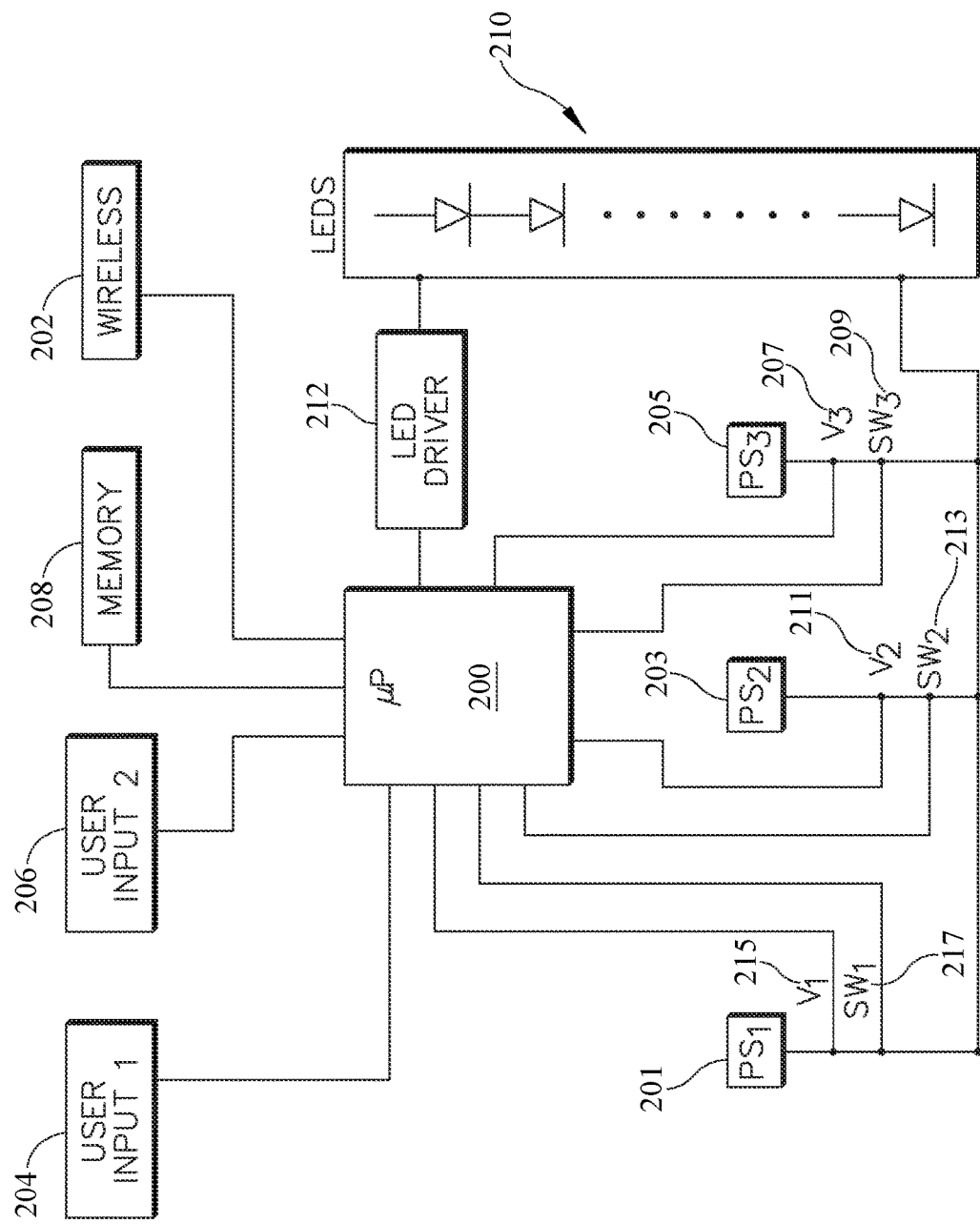
FIG. 9 is a block diagram showing elements of the control circuits and system in one embodiment of the present disclosure.
Figure 13A:
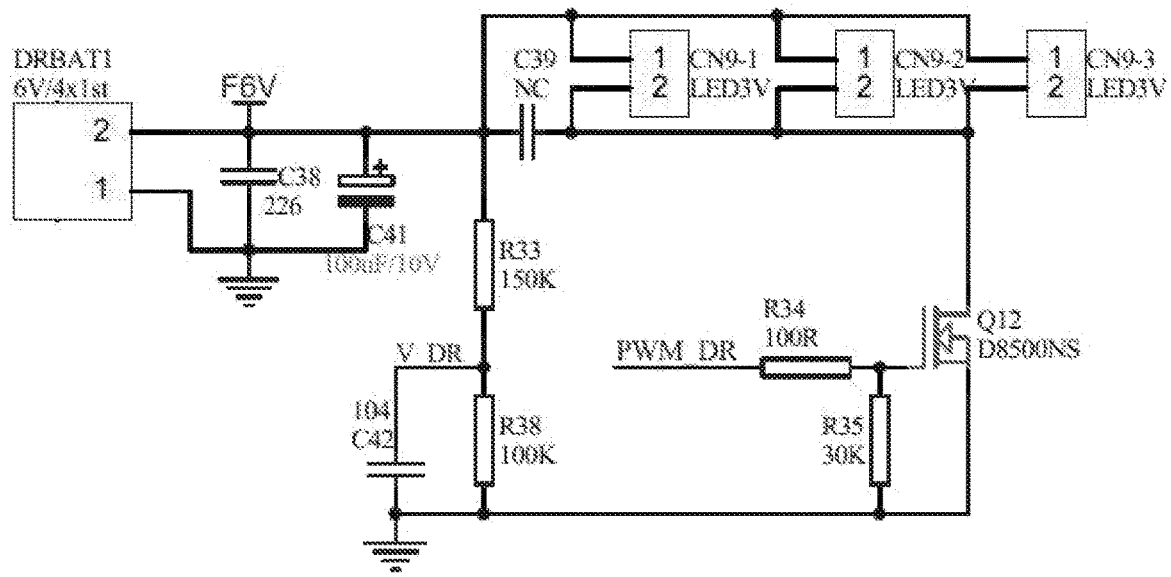
FIG. 13A is a portion of an exemplary associated priority circuitry for a backup connection and illumination of LEDs.

Detailed in FIGS. 8, 9 and 13A/B, exemplary electronic circuits, configurations and user interface is shown supporting the three variant electrical supply inputs. Multiple electrical sources may be connected to the security light and the system may selectively connect to preferred electrical sources. For example, the security light 100 may be configured to prioritize renewable electrical supply of the solar station and illuminate at associated illumination characteristics when selected. Alternatively, if the solar station supply is unavailable or exhausted, the system may select electrical supply from the junction box with other different associated illumination characteristics. Further, when no other electrical source is available, the system may select a backup internal battery power supply at further different associated illumination characteristics. The disclosure of FIG. 9 is provided for schematic exemplary purposes only as many different configurations of supporting electronics and control systems may be utilized to implement similar features described herein.

The outdoor security light 100 may have an internal microprocessor/MCU 200 which acts as the illumination or lighting controller. The controller 200 in this example can receive as input multiple voltages or other electrical input signals which provide information as to the status of the connected power supplies. The illumination controller may also include memory 208 which stores user preferences and program instructions. The illumination controller may also be connected to various communication modules and communication electronics. For example, the controller 200 can sense the status of an electrical characteristic for the connected first electrical supply input 201, second electrical supply input 203 and third electrical supply input 205.

In some examples, the first electrical supply input could be an electrical connection to the electrical cables 4 at the junction box 3 to which the housing mount 102 is electrically connected. The electrical connection to the housing mount allows the housing mount to modify the line voltage to any required electrical connection characteristic needed to further supply electricity to the various components of the security light 100. For example, the housing mount 102 may modify the input electrical connection from standard line voltage AC to a reduced low voltage DC to operate the internal security light electronics. Beneficially, by providing modification of the electrical connecting at the housing mount 102 allows the connection interface between the housing mount 102 and the luminaire housing 104 to be low voltage increasing the ease of installation and design of the electrical interface.

The illumination controller 200 may sense the electrical characteristic of the first electrical power supply prior to or after modification of the electricity within the housing mount. Alternatively, for example, the electrical characteristic of the first electrical power supply may be taken after voltage regulation and at a sampling point where the low voltage DC electricity is provided to the luminaire housing or electronics within the luminaire housing.

In other examples, the second electrical supply input 203 may be a remote solar charging station 114 and may include a rechargeable battery 120 which is connected to a connection portal or input 146 on the luminaire housing via a wired connection 117. In still further examples, the rechargeable battery 120 of the remote solar charging station 114 may be positioned on-board of the luminaire housing 104 or intermediate thereof. In some implementations, the remote solar charging station 114 may be integrated into the structure to which the security light is attached or may be integrated into the security light housing 104. As installed however it may be preferable to have the photovoltaic cells 116 in direct sunlight separate from shadows or other obstructions. Positioning the photovoltaic cells on a roof or other stand-alone area may provide increased charging conditions for the rechargeable battery 120 of the remote solar charging system. Alternative constructions may be implemented. For example, a photovoltaic power cell may be integrated into the housing of the security light 100 or into a wall mounted power cell nearby. Depicted in FIGS. 1A, 1B, 4 and 7, a remote solar charging station 114 is provided having at least one photovoltaic cell 116 which charges a rechargeable battery 120 in the base 122 of the remote solar charging station. The station is connected by wire or other electrical connection 117 to the luminaire housing to provide an additional source of electrical supply input.

Figure 5A:
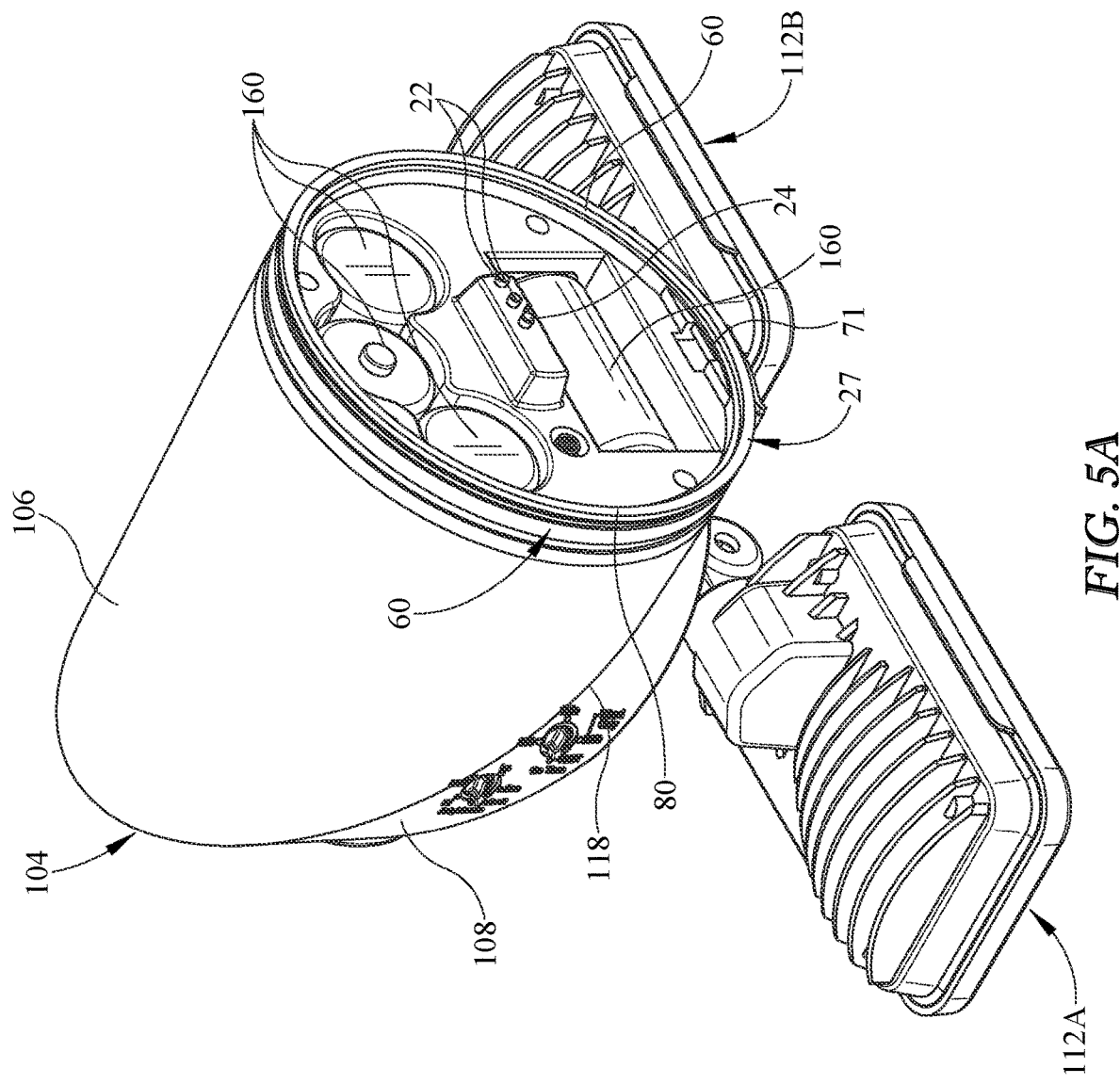
FIG. 5A is a rear perspective view of the rotationally adjustable security light of FIG. 2 with the rear panel removed, according to an embodiment of the present disclosure.

In still further examples, the third electrical supply input 205 may be a battery pack internal to the luminaire housing 104 such as, for example, one or more replaceable backup battery system 160. The third electrical supply input 205 may in some implementations be provided as a power source of last resort, wherein the electrical supply at the junction box connected to the first electrical supply input has been disconnected or is not available, and the rechargeable battery of the solar charging station is depleted or below a nominal voltage or other value. The third electrical supply input is depicted in the embodiment of FIG. 5A as a plurality of batteries stored within the luminaire housing. However, the battery pack can be a singular battery or a remote storage facility. In implementations, the replaceable backup battery system may act as a backup battery supply when all other electrical supply options fail.

The illumination controller 200 may have a default lighting output characteristic depending on which electrical supply input is connected to the load of LEDs 210. For example, when the controller switches connection to the junction box first electrical supply input 201, the output lighting characteristic may be to illuminate each of the connected lamp heads to a maximum output of 1000 lumens per lamp head. Alternatively, if the lighting controller 200 connects the load to the remote solar charging station supply 203, a default lighting characteristic may be to illuminate each lamp head at 750 lumens per lamp head. Finally, when the lighting controller 200 determines that backup electrical power supply 205 is required, the internal replaceable backup battery system are connected to the LED load 210 and the controller 200 may utilize a lighting characteristic of up to 500 lumens output per lamp head.

As depicted in FIGS. 8 and 9, the lighting controller 200 may receive multiple input signals including user input 1, 142, user input 2, 144 and/or wireless input 202. These user input selections may be entered from a dial, as shown in the example of the figures, or switch, slide or other selection device accessible to the user. Alternatively, user input may be received from a wireless transceiver 202 which receives user selections from a remote device, such as a smart phone or computer or instructions from a server.

For example, user input interface may be provided on the outside of the luminaire housing such as dials 142, 144 shown in FIG. 8 or as user input 1 204 and user input 2 206 shown in FIG. 9. As depicted, user preference is provided for a lighting output characteristic of brightness at dial 144. Multiple modes may be selected by the user to modify a lighting output characteristic. For example, a user selected input of HI may require all lamp heads be powered at a maximum level of 1000 lumens per lamp head regardless of the associated illumination characteristic for the selected power supply. Similar settings may be entered by the user for a Medium setting at 750 lumens per lamp head, Low at 500 lumens per lamp head, or an Economy mode, all of which set the lighting output characteristic. The user selection of lighting output characteristics may over-ride a default automatic system characteristic as outlined in an electrical connectivity priority list, discussed herein.

Similarly, user input 2 206 from dial 142 may include a dial accessible by the user which sets On Time timer values if motion is detected by the outdoor security light sensors. Settings may variably include 20 seconds, 60 seconds or any desired amount. Such settings by the user, either through an external interface or received via command at wireless interface 202 may override associated default settings. Optionally, a "Wired Only" setting may be provided for dusk to dawn illumination. When the security light is connected to a wired line voltage electrical connection, dusk to dawn setting may also be provided and selected by the user to override other associated detected connectivity options by the controller.

In some implementations, each of these exemplary user input values may represent other alternative operational input settings. For example, in some implementations the user may select lighting color. In other implementations, the user may optionally select and/or modify input sensors to the controller 200. For example, user input may optionally include modifications to motion sensor sensitivity. In still further examples, user input may modify values associated with ambient light sensitivity using a photometric sensor. Each user preference may be saved in the system memory 208. In implementations these preference values may be stored in system memory 208 and be updated and/or modified by the user. Such modification may be through direct input on the luminaire housing, such as through dials 142, 144 or may be reflected in received data. For example, the communications module 202 may be a wireless communication module capable of interfacing with a user device. Alternatively the communication module may communicate with a server which transmits such user preferences per a user setting in a server account.

While the term line voltage is utilized variously herein as a connected power supply for the security light, generally it reflects the desire to have a "wired connection" to the residence or fixed electrical supply from an external supply source. For example, a line voltage wired connection may be the electrical supply at the residence or building where the luminaire is installed. The wired connection may be through the junction box at a wired junction point of known house copper wiring carrying 120 or higher VAC. However it does not have to be, nor is it meant to limit to such specific electrical characteristic. Namely, it simply means that the outdoor security light is connected by wire to a fixed electrical source which is regularly maintained.

Lighting controller 200 receives various signal inputs and controls the output light of the LEDs 210. Other inputs may be received such as a photocell to detect ambient light, as well as a motion sensor, such as a PIR, both of which may provide voltage or other electrical signals to one of the plurality of inputs of the MCU 200.

Memory 208 may also be incorporated into the control system containing instructions for implementing the various features and functions noted herein as well as storage for user preferences, selections and operational characteristics of the LEDs.

In operation and in some implementations, the lighting controller 200 may utilize a voltage detect signal at each of the first, second and third electrical supply inputs, 201, 203, 205. For example, a detection node at 215, 211 and 207 may provide signals to the controller indicating the viable electrical connection and operability of each of the electrical supply inputs. For example, if a voltage signal is detected at the various nodes, the controller may select an electric supply input based upon a preferential list of connections. For example, if a voltage is detected at each voltage detection node, the controller may automatically default to select electrical supply input 1, 201 which may represent a wired line voltage connection from the junction box. This detection node 215 may be positioned after voltage regulation of the electricity received from the junction box or prior to reduction of voltage to a low voltage supply at the mounting face of the housing mount.

Detection nodes 207, 211 and 215 may be variously located at taps adjacent to the electrical supply inputs in the main luminaire housing. Alternatively, the detection nodes may be external and appropriate signals provided either using a wired or wireless connection accessible to the lighting controller. For example, the controller may sample representative flag bits set by other electronics and/or circuits, each of the bits indicating that an electrical supply input is active.

In some implementations, voltages may be detected at each of the detection nodes 215, 211 and 207. Other electrical characteristics may also be detected at the nodes indicating that a viable electrical connection exists at the power supply input. For example, the detection node may sample current, impedance or any other electrical characteristic indicating that a viable electrical supply is present. Corresponding circuits may be utilized at each of the detection nodes to provide an appropriate signal to the MCU 200, set flag bits or in some way communicate the status to the controller. For example, multi-pin comparators and voltage reference signals may be utilized to detect either the presence of electrical supply, under-voltage detection within a battery system or other alternative detection systems.

In operation, the controller 200 receives signals representative of the electrical characteristics from the detection nodes 215, 211 and 207 and selects a power supply to connect to the load, namely the LEDs 210. For example, switches 217, 213 and 209 may be electrically connected to the controller 200 allowing the controller to connect a selected electrical supply input to the LEDs. For example, MOSFETs, gates, latching relays, triacs or other switch or combination thereof may be utilized to selectively connect a selected power supply and later implement electrical connectivity to the load 210.

For example, a default selected electrical supply input may be wired connection/line voltage at electrical supply input 201 after sensing an appropriate signal at detection node 215. Switch 217 may be selected and activated while switches 213 and 209 may be kept open. Alternatively, if the detection node 215 fails to detected electrical connectivity of the power supply at electrical supply input 201, a secondary supply 203 may be elected. Supply 203 may be the solar charging station rechargeable battery, if connected. Alternatively, if no appropriate signal is detected at detection nodes 215, 211, the on-board replaceable backup battery system may be connected to the load, a part of the load or a separate backup load/LED set which operate at a lower power drain.

The default connection may be modified by the user through user input 204/206 or through wireless input 202. For example, a user may elect to continually use the rechargeable battery in the solar charging station 203 and switch to a wired connection 201 once the sensed electrical characteristic at 211 falls below a predetermined value. For example, in some implementations, the controller may receive input to select the solar charging station 114 as the first priority electrical supply input and continually monitor the rechargeable battery 120. In some implementations, upon reaching a predetermined battery storage level, the controller 200 may switch to a second priority electrical supply input. The user may further over-ride a default selection of the controller to require a particular order of electrical supply input selection. For example, the controller may have a defined order of electrical supply input selection of wired input at 201, rechargeable input at 203 and backup system power at 205. A user setting however may over-ride or modify such selection order. Such user setting may be stored in memory 208. For example, a user selection setting may set out that the remote soar charging station is the first priority electrical supply input, with the wired connection 201 as the second priority electrical supply input and replaceable backup battery system at 205 are to be used as the third priority electrical supply input.

A default or user supplied input may also elect a defined lighting characteristic output be utilized when the various electrical supply input is selected. Such characteristic may reduce or increase the light output intensity. For example, associated with each defined priority electrical supply input, an associated output illumination level for motion may be defined. Other associated illumination characteristics may also be defined for the selected priority electrical supply input such as output illumination level for non-motion, motion on timer illumination value or other associated values for the selected priority electrical supply input. For example, a table of Electrical Connectivity Priority list may be stored in associated memory 208, such as the table outlined in FIG. 12.

For example, in an exemplary installation, the luminaire 100 is connected to the house electrical power supply as the first electrical supply input 201. Additionally, the remote solar charging station 114 may be positioned remotely to allow recharging during the day of the battery 120 and be electrically connected to the housing 104 via remote connection line 117. Replaceable backup battery system 160 may be provided internally within the luminaire housing as a backup battery supply, each of which may be accessed and recharged or replaced as they are depleted. Controller 200 may regularly measure voltage signals at taps 207, 211 and 215 to determine the connectivity of the individual power supply and the health of such power supply. According to default list of electrical connectivity priority, the controller may activate one of the plurality of switches 209, 213 and 217 to connect the optionally selected power supply to the load along with the illumination and operation characteristics associated with the selected electrical connection.

In some implementations, the controller may also allow for contribution of power from the various power supplies 201, 203 and 205. For example, the controller may optionally select as a default the rechargeable battery at power supply 203 while also contributing a portion of driving electricity from the wired power supply 201. In such a manner the controller may be operable to extend the life of the rechargeable battery and/or allow contribution of electricity from any of the three power supplies. For example, a situation may arise wherein more current may be provided to the load of LEDs than the output current rating of the batteries at the available and connected power supply. In some implementations, connection of two or more power supplies in parallel may deliver the desired current to the load. Known methods of connecting more than one power supply to the load may be implemented. For example, paralleling multiple power supplies may be accomplished using components required for proper load regulation and maintaining appropriate output current to the load.

For example, in one implementation, the controller 200 may elect the remote solar power station to be the default power supply. In some implementations, the controller may maintain a low level of lighting or no lighting by the LEDs. Upon detection of motion, the controller may begin or significantly increase the light output levels. In such implementations, the controller may seek to seek contribution of the power supply from a connected wired electrical source at wired supply input 201 so as not to drain the rechargeable battery. In some implementations, the controller may implement such electrical contribution for a limited amount of time, for example during the MOTION-ON duration of the high intensity output. In some implementations, the controller may implement electrical contribution at specific LEDs or lap heads. Controller 200 may seek power contribution from any of the power supplies 201, 203 and 205.

In some implementations, the outdoor security light 100 is set for illumination only during a detected environmental condition. For example, a motion sensor 110 positioned on the luminaire housing 104 may signal motion near the installation. The security light may be connected to multiple electrical power supplies but the security light may illuminate only upon detection of motion. Various illumination characteristics may be utilized adjusting or modifying the illumination characteristic based upon the selected electrical power supply. The motion sensor may provide a signal input to the illumination controller 200 as shown in the various examples.

Other sensors may similarly be provided on the luminaire housing to provide input to the illumination controller 200. For example, photometric sensor may be similarly positioned on the exterior of the housing indicating sunset allowing the luminaire to illuminate the lamp heads 112A, 112B at a predetermined illumination characteristic.

In some implementations, an electrical connectivity priority list may be maintained within memory 208 or implemented through controller circuitry. For example, in FIG. 12, a prioritized list of Priority Electrical Connections may be maintained with associated output illumination levels as well as other associated data for each element in the list. For example, a prioritized list of preferred electrically connections may be maintained and adjusted by the user. As an example, electrical supplies 201, 203 and 205 may be available to the luminaire. The priority electrical connection in the electrical connectivity priority list may define the order of electrical connectivity of each of the electrical supplies. For example, Electrical Input 1 in the Priority Electrical Connection may be electrical supply 203, the remote solar station. Electrical Input 2 may be selected as the wired electrical connection 201 and the electrical input 3 may be the onboard backup battery supply 205. Each of the priority electrical connections in the priority list may also be associated with output illumination levels for motion, non-motion, On-Timer and other associated values for the selected electrical input. Further, each of these values may be adjusted or selected by the user or, alternatively, over-ridden by a user selected setting in the user interface.

By utilizing such electrical connectivity priority list, the presently described system, method and apparatus may utilize may forms of prioritization for each of the electrical connections. As shown, one implementation may be the table of FIG. 12 maintained within system memory and accessible to the controller or other hardware. Similarly, prioritization of the electrical connections may also be implemented in purely circuit form, such as aspects of associated priority circuitry. In application and as described herein, some implementations may use a combination of predetermined priority, such as the described tables, and the associated priority circuitry. In other implementations, prioritization may be implemented solely through associated priority circuitry whereby each electrical connection is prioritized over other electrical connections. However, such implementations are mean to fall within the description and use of the terms of either priority electrical connections, associated priority circuitry, and similar terms used herein to infer a prioritization of the connected electrical supplies.

For example, the default priority electrical connection may be Electrical Input 1 is the rechargeable battery 203, Electrical Input 2 is the line voltage junction box connection and Electrical Input 3 is the battery back 205. Associated Output Illumination Levels for Motion may be stored for each of the priority connections, such as 750 lumens for Electrical Input 1 (the rechargeable battery 203), 1000 lumens for Electrical Input 2 (the junction box, wired connection), and 500 or fewer lumens for Electrical Input 3 (the backup batteries). When set to operate accordingly, other associated values may similarly be stored in the electrical connectivity priority list of FIG. 12, such as Output Illumination Level for Non-Motion, Motion On Timer and other values such as color temperature. For example, a higher intensity color temperature may be selected for each of the settings. Each of these values may be stored in system memory 208 or may be implemented through associated priority circuitry, as depicted in FIGS. 9 and 13A/B.

Figure 13B:
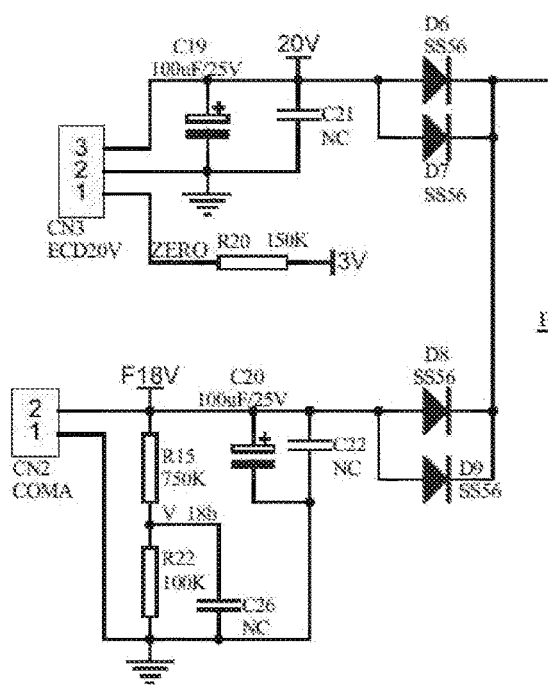
FIG. 13B is an additional exemplary associated priority circuitry for selecting one of multiple electrical power sources for the prioritized electrical connection.

In some implementations, the associated priority circuitry may be as depicted with the controller 200 of FIG. 9 as well as various sensors, memory and other elements. In some implementations, MCU 200 may receive as input multiple sensor voltages and signals and control output. Circuitry depicted in FIGS. 13A/B may be integrated in various implementations with an MCU for input and control of the various functionality described herein. For example, switches 209 213 217 may be replaced with logic wherein diodes are reverse biased upon output of the solar panel circuit at a predefined voltage, say for example 18V wherein output from the conversion at the line voltage line may be 20V. For example, as depicted in FIG. 13B, diodes D8, D9 allow fora default selection by the associated priority circuitry located within the system circuit board and through control in combination with an MCU. Other implementations of course are available for aspects of associated priority circuitry for selection, control of output illumination characteristics, duration, polling, motion signal detection and control, backup detection, power failure or outage, and the like.

Other aspects and implementations of the associated priority circuitry are implemented, either through instructions stored in associated memory 208 or in circuits or in a combination of both. For example, in some implementations, LEDs 210 may be subdivided into a subset of backup LEDs. Upon detection by the controller 200 that there are batteries connected at sampling point 207 from the third power supply 205, and when neither line voltage or remote solar station voltage (or other detected characteristic) are available at 201, 203, the controller may illuminate only a wired subset of the LEDs 210 that are backup LEDs. The subset of LEDs within the LEDs 210 may be a separate wired bank of LEDs that are only illuminated by the backup power supply 205, or alternatively may be a switched subset bank of LEDs which are powered by all electrical connections. Such backup electrical source illumination may, in some examples, be activated via energizing gate of Q12 depicted in FIG. 13A and presented at a lower lumen output and hence, lower load and drain on the batteries. Further, as previously outlined, such activation of the backup LED subset CN9-1, CN9-2, CN9-3 may operate only on detection MOTION ON signals.

For example, a separate backup subset of LEDs such as CN9-1, CN9-2, CN9-3 may be a backup LED subset part of the associated priority circuitry which are activated only upon detection of a power outage condition at PS1 201 and PS2 203. Such power fail condition could be detection of low or no voltage at sampling nodes previously described. In such a condition, switch Q12 activates illuminating the backup subset of LEDs at a lower voltage upon detection of a motion sense or MOTION ON signal. Variations in implementation may be incorporated in such design. For example, while a separate set of LEDs CN9-1, CN9-2, CN9-3 are depicted as being connected to the backup power supply PS3 205, a switched subset of the LEDs 210 may also be used for backup illumination, the subset of LEDs utilized as backup LEDs also accessible in regular or other default illumination. Further implementation modifications may incorporate backup illumination at times other than when motion is detected such as, for example, at dusk, upon receipt of an ACTIVE ON signal either through use of a user interface or received via wireless command or other alternative illumination requirements.

The system configuration of FIG. 9 may be combined with various circuit details required implement the aspects outlined herein. For example, the associated priority circuitry of FIG. 13 may be utilized within the system of FIG. 9 as well as aspects of portions of the system operation may be further replaced with additional circuit elements.

Figure 10:
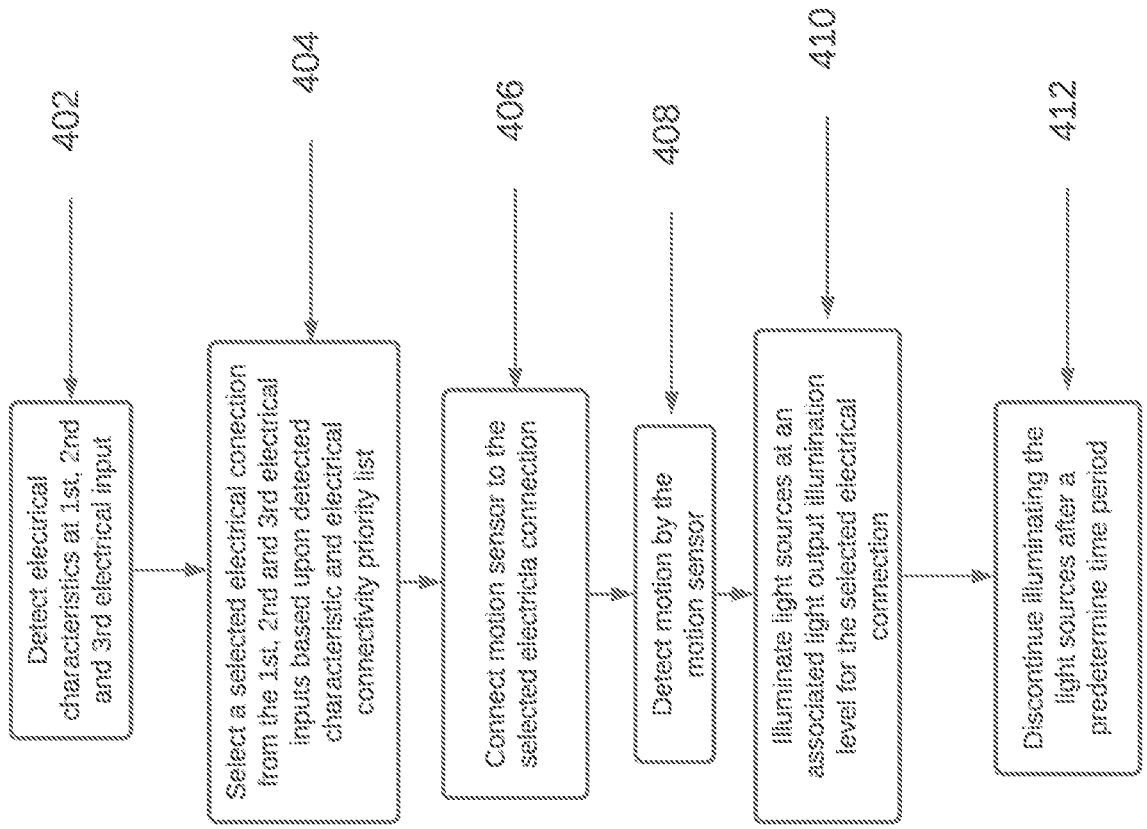
FIG. 10 is a flow chart for priority list processing of input electrical source from multiple sources along with associated illumination levels.

In various implementations, the controller may be operable, by executing program instructions stored in system memory 208 or through dedicated associated priority circuitry or a combination thereof, of executing a method for controlling an outdoor security light. The method may incorporate various steps and process elements, as are outlined in FIGS. 10, 11. For example, in aspects, the system includes sensing, at step 402, by the illumination controller, an electrical characteristic at a first electrical source input, a second electrical source input and a third electrical source input. The sensed electrical characteristic may include sensing a voltage, current, impedance or any other measurable aspects of the power supply which would indicated that the power supply is a viable supply to power the load, namely the LEDs of the lamp heads. For example, the controller may read voltage measurements at various points along the power supply control line. Backup battery power or a dedicated battery power source may be provided on board of the system motherboard to energize such preliminary logic operations to initially detect electrical characteristics before a power source is selected or during any of the operations herein.

Based upon the sensed electrical characteristic, the method may further include at step 404 selecting one of the first electrical source input, the second electrical source input and the third electrical source input. Each of the three electrical source inputs may have an associated priority circuitry as defined by the system circuitry or within an electrical connectivity priority list. In implementations, the system may be designed to provide such selection either through executing code buy the controller, stored in system memory 208, detailing such selection process. Alternatively, the system circuit design may incorporate aspects of the associated priority circuitry to perform such selection. Even further implementations may combine aspects of an associated priority circuitry and system controller 200 with associated instructions.

In some implementations, at step 406, the system may then connect the motion sensor and/or other circuitry to the selected electrical connection from the first, second or third electrical input. Upon detection of a motion signal by the motion sensor at step 408, the system may connect a plurality of LEDs in at least one lamp head of the security light to the selected electrical connection. The system may then illuminate the light sources at an associated light output illumination level for the selected electrical connection at step 410. At step 412, the controller or other implementation circuitry may discontinue illumination of the light sources after a predetermined period of time. The predetermined period of time during illumination may be a global setting or may be associated with the particular selected electrical supply.

In some aspects, the sensing of the electrical characteristic includes at least sensing a first voltage at the first electrical source input. In implementations, the sensing of the electrical characteristic further includes sensing a second voltage at the second electrical source input and sensing a third voltage at a third electrical source input. For example, in such implementations the sensed voltages may be required to meet a minimum voltage requirement before the controller connects the electrical source input to the LEDs. Alternatively, circuit elements, as shown or described herein, may implement such selective connectivity. For example, diodes or switches may connect and/or disconnect various power supplies to the load.

Figure 11:
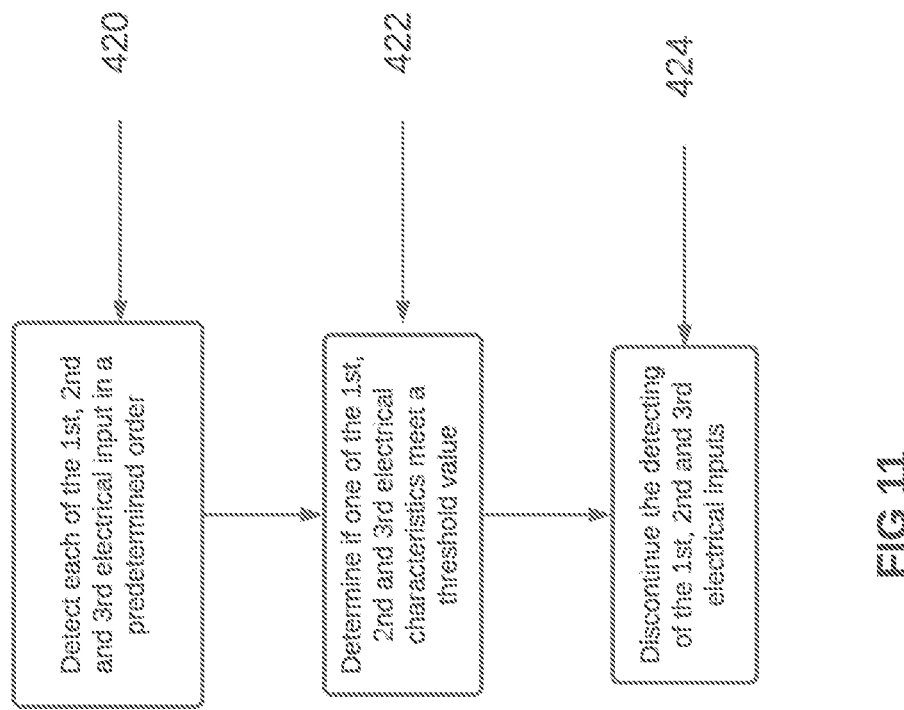
FIG. 11 is a flow chart for the system described herein detecting which of multiple power sources to select.

In still further implementations as shown in FIG. 11, the method may include detecting at step 420 each of the $1^{st}$, $2^{nd}$, and $3^{rd}$ electrical inputs in a predetermined order. The detecting/sensing of the electrical characteristic includes detecting at least one of voltage or current. In such implementations, the connecting further includes selecting the first electrical source when the sensed first voltage meets a predetermined detected minimum condition or threshold, as outlined at step 422. In such further implementations, when the sensed first voltage fails to meet a predetermined condition, the method further determines if the sensed second voltage meets a second predetermined condition; when the sensed second voltage meets the second predetermined condition, selecting the second electrical source input. Further, the implementations includes that when the sensed second voltage does not meet the second predetermined condition or threshold, determining if the sensed third voltage meets a third predetermined condition; when the sensed third voltage meets the third predetermined condition, selecting the third electrical source input. If such detection and selection is conducted in a predefined priority order, in some implementations, once the condition or threshold is met, the system may discontinue detecting at the remaining electrical inputs at step 424.

In still further implementations however detecting each of the $1^{st}$, $2^{nd}$ and $3^{rd}$ electrical inputs may continue during operation of the outdoor security light. The steps outlined in FIG. 11 may be repeated after a predetermined period of time. Repeated polling of the taps for each of the power supplies may be desired to detect failures at each of the power supplies to ensure automatic swapping of power supplies during such failure. For example, when an automatic swapping circuit is not employed, as is disclosed in FIG. 13, the controller 200 may regularly poll the electrical characteristic. Also, for example, when the selected electrical input set forth in the electrical connectivity priority list, is not a source having a higher priority, continued polling and detection of the higher priority source allows the system to switch back to the higher order source input. For example, the highest order source of Electrical Input 1 in the list of FIG. 12 is the second power supply PS2 203 which represents the remote solar cell. Upon the solar cell battery depleting, the system will automatically swap to Electrical Input 2 of the priority list PS1 201 by virtue of continued detection and selection of the system, or as a result of the associated priority circuitry, or a combination a both. The system may continue to poll the health of the tap for PS2, representing the higher order Electrical Input 1 in the priority list, to switch back to the preferred source when it becomes available.

While FIGS. 9 and 13 depict exemplary configurations of a controller and circuit connections for the outdoor security light described herein, many modifications and alternative circuits and components may be utilized. For example, dedicated application specific integrated circuits may be customized for particular use in receiving various input signals and providing necessary output signals for driver control, load control and also control and selection of a power supply for the luminaire.

Figure 4:
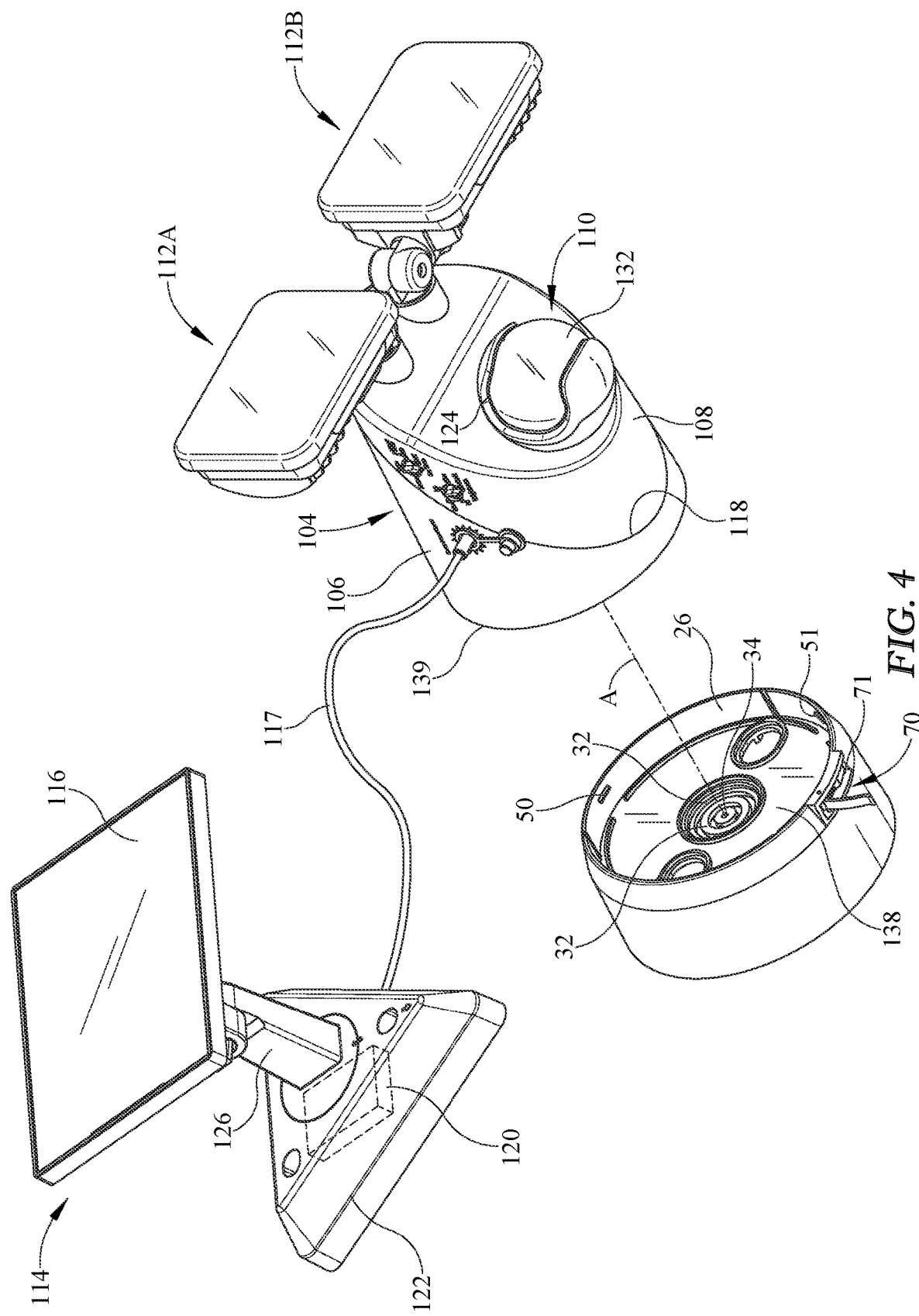
FIG. 4 is an exploded view of a rotationally adjustable outdoor security light connected to a solar battery panel, according to an embodiment of the present disclosure.

As shown in FIGS. 1A, 1B, and 4, the remote solar charging station 114 may include photovoltaic cells (PVC) 116, and may be connectable to the security light 100 by plugging a removable power transfer cord 117 into a solar panel input on the luminaire housing 104. The solar charging station 114 may include at least one rechargeable battery or other power storage 120, which fits within a base 122. In some embodiments, the photovoltaic cells 116 are utilized to charge the rechargeable battery 120 contained within the station. The rechargeable battery of the remote station 114 may be operably connected to the second electrical supply input 203.

In various embodiments, the solar charging station 114 may be directly adjacent with the security light 100 or may be positioned remotely therefrom. In some embodiments, the solar charging station 114 may be mounted in a location which is more conducive to collection of sunlight on the PVC 116. For example, the charging station 114 may be a remote charging station positioned on the roof 7 of a structure while the security light 100 may be positioned underneath of the eave 1 where the sun would not regularly be available for charging of the batteries. Thus, in some configurations, a remote installation for the charging station 114, such as on the roof 7, is efficient for charging the power supply.

As shown in FIGS. 1A, 1B, and 4, the cells 116 may be hingedly affixed to the base 122 by a hinged connection and arm 126 so that the PVC 116 may be optimized to be directed towards the sun during the day. Adjustment allows maximizing conversion of the sunlight to electricity for the charging cycle of the rechargeable battery 120 and power supply of the security light 100. The arm and hinged connection 126 may further be rotatable on the base to allow for two axis adjustments of the PVC 116. The base 122 may also include appropriate attachment mechanisms to affix directly to a wide variety of structures and configurations (e.g. a roof, a wall, etc.). For example, the base may mechanically attach to a structure via screws, may be frictionally attached to a surface, Velcro or other systems/connections to removably or permanently attach one or all of the parts of the station 114 to a structure remote from the luminaire 100.

The remote solar charging station 114 may incorporate the PVC 116 of sufficient size in order to recharge the rechargeable battery 120 in order to appropriately power the lamp head 112 and power the associate controller electronics and sensors. The rechargeable battery 120 is sized sufficiently to power the control electronics and the load for desired illumination characteristics when motion is detected as well as to provide illumination under normal operating conditions. For example, in various embodiments, an arrangement of the PVC 116 having an area of about 200 cm2 and a standard or average efficiency of 16% may create 12 watt-hours of electricity which can be stored in the rechargeable battery 120 on a day having 4 hours of sunlight. Depending upon the configuration of specific lamp head 112 or multiple lamp heads, and considering the number of times the system is activated by the motion sensor 110, the system may allow for activation of the lamp head 112 about 15-30 times a night which may utilize approximately 4 watt-hours. The rechargeable battery 120 may have a battery storage requirement that is sufficient to appropriately store 12 watt-hours or more, even with successive non-sunny days.

In some embodiments, the base 122 of the solar charging station 114 may include charging circuits and related controllers. In embodiments, charging circuits may be integrated with the rechargeable battery 120 and the remote solar charging station 114. Such charging circuits may include known techniques for receiving the low voltage from the PVC 116 which may be anywhere between single volt up to a standard 12 volts, depending on the number of cells respectively connected together. Typically, individual cells produce an open circuit voltage of about 0.5 to 0.6 volts at 78° F. This voltage and the associated current are managed by a charging circuit or other electronics for proper regulation, modulation, and/or modification for trickle charging of the rechargeable battery. The remote solar charging base electronics further protect the rechargeable battery 120 from overcharging, monitor battery charge levels and temperature, report levels to a controller and limit input and output current to the various parts of the system. The solar charging station 114, while disclosed as being remote from the security light 100, may alternatively be affixed to the security light 100 in other implementations. The electronics positioned within the base 122 may also be incorporated within the security light 100 and control signals transferred therefrom by the associated power transfer cord 117. For example, monitoring of the battery, charging and performance may be conducted remotely by the controller 200 instead of dedicated electronics at the remote charging station 114.

In some embodiments, the security light 100 also includes an interior replaceable backup battery system compartment in case of power interruption. For example, as best shown in FIG. 5A, single or multiple batteries 160 may be provided within the luminaire housing 104. The batteries 160 provide a third power supply 205 to the security light 100 and are in electrical communication with the controller 200. The batteries 160 may be a standard alkaline battery or may be other replaceable battery systems, such as a rechargeable Lithium Ion power storage source. The battery backup system are insertable into the luminaire housing 104 or kept in close proximity thereof for use when the junction box 3 and/or the solar charging station 114 have insufficient power to appropriately energize the security light 100 and/or other load factors. For example, when there is an outage of the wired voltage connection at the junction box 3 and the voltage level of the rechargeable battery 120 in the solar charging station 114 is determined to be too low, the security light 100 may operate using the battery 160. In some implementations, such operation may be in a reduced lighting level. The first lamp head 112A and the second lamp head 112B may operate independently (e.g., only one lamp head may be activated) when powered by the battery 160 to further reduce energy consumption and extend the life of the batteries 160. Batteries 160 depicted in FIG. 5A are typical alkaline batteries for discussion purposes only. Rechargeable battery packs may, in combination or instead of, be placed interior to the housing to reduce the total footprint of the battery compartment as typically rechargeable batteries 160 may require less compartment space than alkaline or other standard batteries.

Figure 6A:
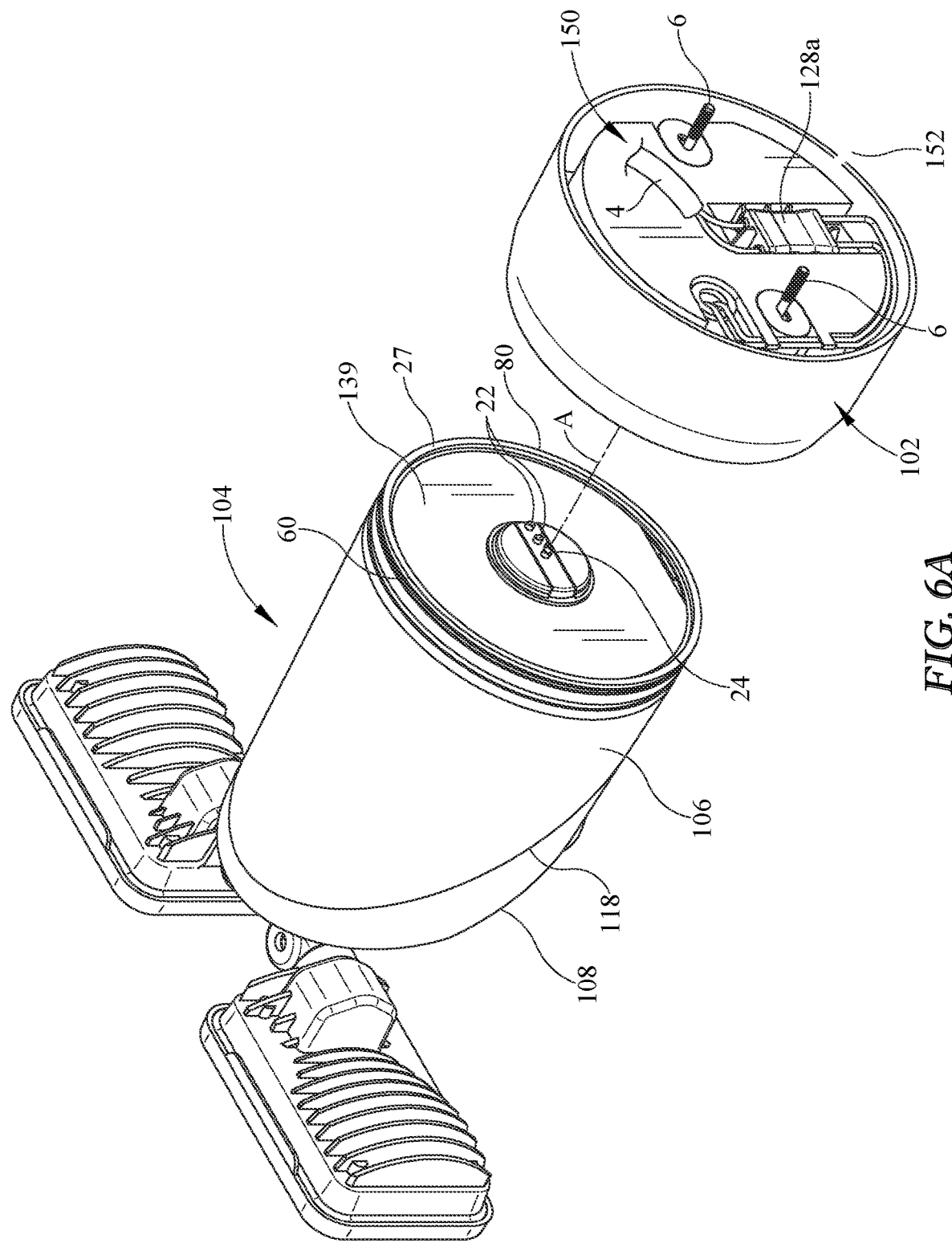
FIGS. 6A and 6B are a rear perspective view of a rotationally adjustable outdoor security light with the housing mount separated from the luminaire housing first and second portion, according to embodiments of the present disclosure.

In various alternative installation embodiments, as depicted in FIG. 6A, wiring may be done with a wiring quick connect harness 128a may be connected to the AC line 4 from the junction box, the quick connect plug allowing ready AC line connection to the interior AC connection line 152 leading into the housing mount 102 for conversion to low voltage. The quick connect plug/harness 128a may be a two piece connection commonly used wherein the line 152 leads through a grommet connection in the back wall 150 to prevent water intrusion. The connection line 152 may then be converted to low voltage which is then provided to the electrical interface between mount 102 and housing 104.

Figure 6B:
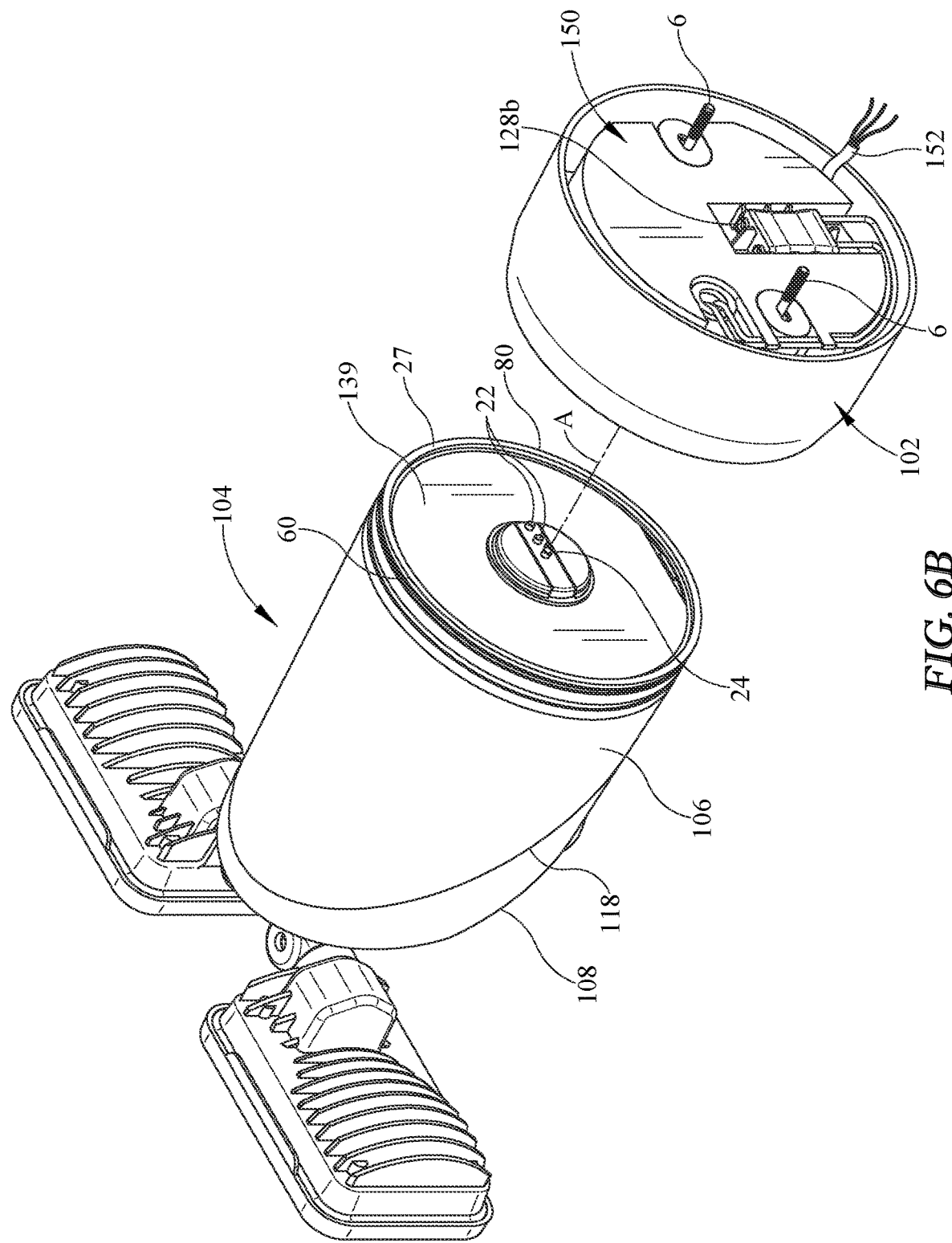

In some alternative embodiments, there may be a secondary and separate backup power compartment, in addition to the batteries 160, operably connected to critical electrical components of the security light 100. Such secondary battery may be utilized for maintaining memory or remote control and/or communication functionality during a power failure and in the instance of a low battery condition for the other battery based power supplies. For example, as shown in FIG. 6B, a power storage device or battery 128b may be held in a cavity of the base portion of the housing mount 102, and the controller 200 and communication electronics may be powered by such an alternative electrical supply for communication purposes with a user device or for other critical operations. Alternatively, a minimum set of electronics may be identified within the security light 100 which receive voltage for a predetermined time period.

To allow the security light 100 to be mounted in multiple configurations, as best shown in FIGS. 1A and 1B, the security light 100 includes a separated housing mount 102 and luminaire housing 104, which may be removably coupled to each other. Providing both a separated housing mount in combination with a rotatable first and second portion of a removable security light luminaire housing increases installation positions and configurations.

Typical installation of the security light 100 set forth herein includes initial installation of the housing mount 102 which is electrically connected to an electrical connection 4 within a junction box 3. The security light luminaire housing 104 may be removably attached to the housing mount 102. The luminaire housing 104 also has both a first portion 106 and a second portion 108, which are rotatable relative to each other. Separate installation of the housing mount 102 to a fixed structure increases the ease of electrical connection and fixating position for both the housing mount and installation of the luminaire body. Further, the housing mount 102 may provide additional and separated functionality, such as modification of the electricity provided by the wired housing/structure to an adjusted low voltage DC. Housing mount 102 may provide mechanical and electrical connection to the luminaire housing 104 once installed.

The housing mount 102 is adapted to be affixed to a surface (e.g., a wall, an eave, a ceiling, etc.) of a building structure. For example, a base or rear portion 150 of the housing mount 102 may include projections, such as a pair of screws 6 (best shown in FIGS. 6A and 6B), for fastening the housing mount 102 to the junction box 3 contained within the structure of the eave 1 or the wall 2, as shown in FIGS. 1A and 1B respectively. Other examples of fastening elements on the base 150, may include but are not limited to, a bracket, a hanger, a brace, a hook, a closed or open slot, or other structure enabling attachment of the base to the wall or eave.

The outdoor security light may also include at least one motion sensor 110 and has at least one lamp head 112 rotatably and adjustably located on the luminaire housing 104. In some embodiments, as shown in FIGS. 1A and 1B, the motion sensor 110 may be positioned along a lower section of the rotatably adjustable second portion 108 and independent from the lamp head 112, so that it may be adjustably positioned relative to the housing and aimed towards high traffic areas or other detection zones. For example, a detection zone may be in front of the installation and lower than an illumination zone. The motion sensor 110 may include at least one sensor and supporting electronics and may also include a lens over the sensor to properly focalize the input towards the sensor or sensors. Other electronics of the motion sensor may be located within the luminaire housing first or second portion 106 or 108 to properly interpret the input and send appropriate control signals to a luminaire controller or other electronics.

The security light 100 allows for multiple installation orientations and includes at least one lamp head 112, which may be adjustably connected to the luminaire housing 104 to adjust the light output or illumination zone. In some embodiments, as shown in FIGS. 1A and 1B, the lamp head 112 may be adjustably mounted onto the luminaire housing second portion 108 via an arm 113. In particular, a first end 111 of the arm 113 may be coupled to the second portion 108, and a second end 115 of the arm 113 that is opposite to the first end 111 may be in a knuckle joint configuration and coupled to the lamp head 112. The knuckle joint 115 may be used to appropriately adjust the position of the lamp head 112 to allow the lamp head 112 to be variably positioned three dimensionally so that a user may direct light emitted from the security light 100 in various directions. Although FIGS. 1A and 1B describe using knuckle joints 115 for the adjustment of a lamp head 112, it should be understood that other supporting mechanisms (e.g., a multi-axis hinge) may also be used to couple the lamp head 112 to the luminaire housing second portion 108. For example, FIGS. 2-7 illustrate a configuration with two lamp heads 112, where the first lamp head 112A and the second lamp head 112B are each rotationally attached to the luminaire housing second portion 108 by a respective first and second rotational hinge 107 and 109. As shown in FIG. 2, the first rotational hinge 107 may rotate about a first rotation axis X while the second rotational hinge 109 may rotate about a second rotation axis Y, and the first rotation axis X may be perpendicular to the second rotation axis Y. It should be understood that even further embodiments may allow for a separated lamp head 112 remote from the luminaire housing 104 and connected thereto by an electrical connection to power and control the illumination sources. For example, a separate lamp head 112 may be individually mounted on a supporting structure by mechanical or magnetic means and be electrically connected to the luminaire housing 104.

The lamp head 112 (e.g., a light bulb, an LED diode, etc.) may utilize various light sources, such as, inter alia, an incandescent lamp, a high intensity discharge (HID) lamp, a light emitting diode (LED) lamp, a halogen lamp, a fluorescent lamp, or any other suitable type of light source. For example, the lamp head 112 may be color LEDS to provide variability in color and/or color temperature. Colors may be implemented by various techniques including known color mixing of predefined color LEDs, modifying color output using luminescent materials, driving LEDs at varying intensity to meet color output requirements, among other known embodiments. For example, in some embodiments, the lamp head 112 may be white LEDs or may be a combination of colors in order to generate white light. The LEDs may also contain blue LEDs, which interact with a phosphorescent or other film over the lens. Color, brightness, direction and other control may be implemented through a lighting controller 200 as depicted in FIG. 9 or through the LED drivers 212 or other similar electronics.

The lamp head(s) 112 may be controlled by various remote devices including, for example, a user smart phone, a web based or app-based control, a built-in motion sensor/detector, and/or a built-in light sensor/detector. Various embodiments for control drivers of the lamp head 112 may be utilized including microprocessors, linear AC drivers or constant current regulators. In some embodiments, the linear AC drivers are ASICs. Other LED or light output drivers and controllers may be used. The lamp head 112 light sources may be provided as LED arrays, segments or individual emitters, any of which may be directly addressable and hence drivable by control and/or microprocessors. Such may include current regulators, voltage regulators, micro-controllers and other circuitry to maintain illumination levels and lighting characteristics of the lamp head 112 light output.

The lamp head(s) 112 may be configured to illuminate at different light intensity levels. For example, the light source of the luminaire may be capable of dimming, or illuminating at a low/medium/high intensity level. In this manner, the lamp head 112 may operate at brighter light intensity levels in certain situations, at moderate intensity levels, at lower intensity levels, or at a zero-intensity level (i.e., turned off). In some embodiments, user specified alternative preferences may further include flashing or blinking the lamp head 112 under predefined conditions. For example, in some embodiments, one or more luminaires or light source units within multiple or a singular luminaire may be programmed to flash intermittently to indicate an alert or warning condition, such as the detected interruption of power. Alternatively, a flashing alert or warning condition may be implemented by programming or user adjustment of controls by one or more LED segments upon detection of motion while concurrently increasing illumination intensity of all remaining illumination segments. Each of these user defined light output characteristics can be programmed and controlled by the controller 200 and be stored in system memory 208.

When the lamp head 112 includes multiple light sources, such as with LEDs, the multiple light sources may be separately controllable and addressable. This allows for a two-step functionality, where different light sources are separately and independently activated in response to respective conditions. For example, as shown in the FIG. 2, the first lamp head 112A may be activated/deactivated based only on low-light conditions being detected by a light sensor, whereas the second lamp head 112B may be activated/deactivated based on both motion detected by the motion sensor 110 and a low-light conditions are also being detected by the light sensor. The low-light condition can be any condition where the amount of light detected by the light sensor falls below an activation threshold, which can be a factory preset threshold level or a threshold level that is adjustable by an end user.

Figure 3:
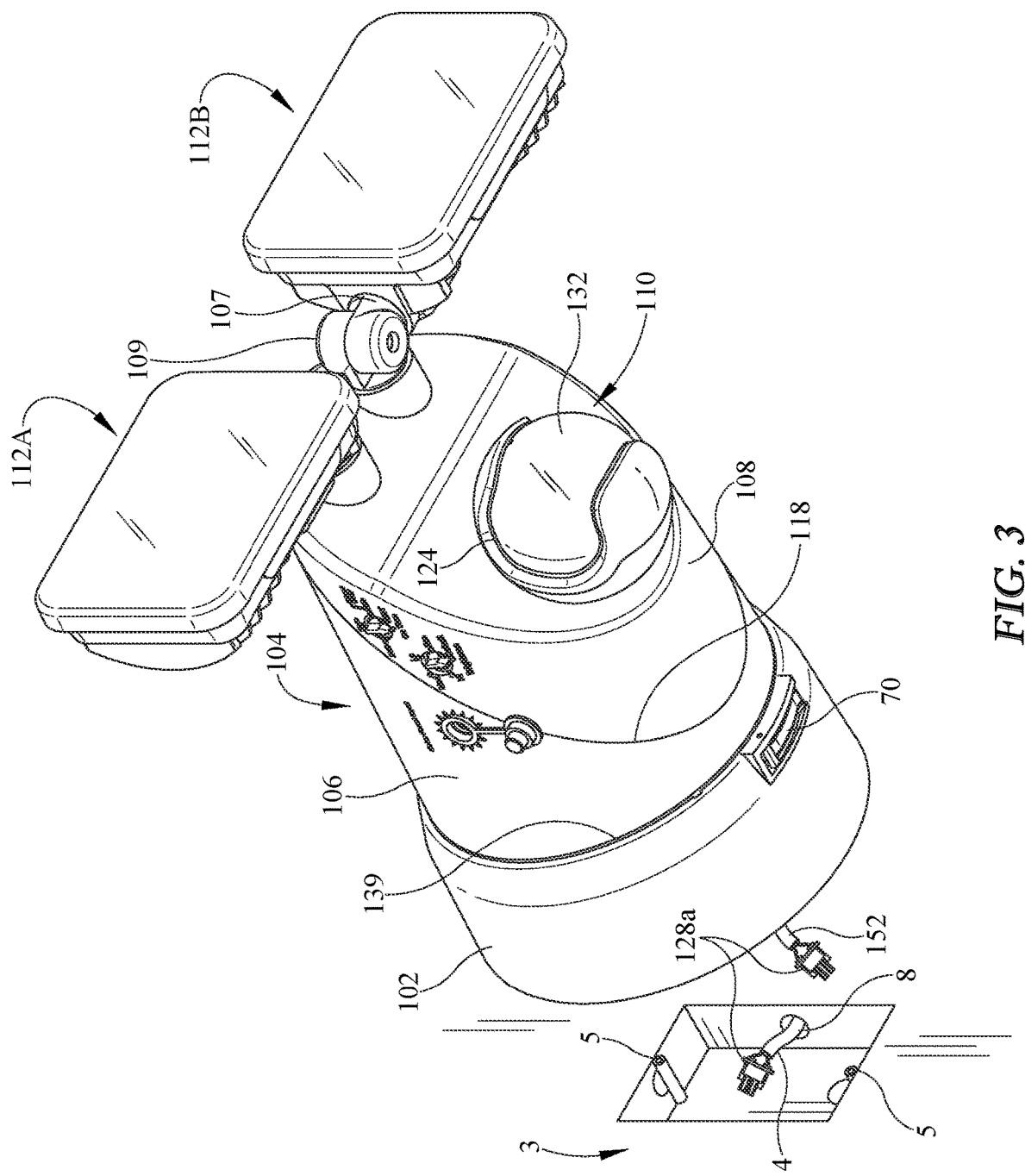
FIG. 3 is a perspective view of a rotationally adjustable outdoor security light connected to a side wall, according to an embodiment of the present disclosure.

FIG. 3 illustrates an embodiment of the housing mount 102 of the security light 100 separated from an associated junction box 3. Electrical wiring cables 4 within the junction box 3 may be connected to an electrical connector 152 to provide a wired line voltage electrical connection to the security light 100 and the embedded electronic components. The electrical connector 152 may be connected to Romex wires 4 (the 110V AC hot, neutral, and ground wires) from the junction box 3 which are threaded through junction box aperture 8. Screw sleeves 5 positioned on the interior of the junction box 3 may receive mounting screws 6 to fasten the housing mount 102 directly to the junction box 3. Any known method of electrically connecting a wire may be used, including, but not limited to, clamping, soldering, clipping, the use of screw terminals, insulation displacement connections, control block style pushing arrangements, or any other method or apparatus. For example, the electrical connector 152 may be twist cap connected to the double insulated multi-conductor cable, oftentimes referred to as ROMEX.

The electronics within the housing mount 102 may accept standard 120V AC line voltage provided by the junction box 3 and modify any electrical input. Such modification may be conversion of the high voltage AC electricity to low voltage DC. The converted electricity can then be provided to the associated components and the lamp head 112 through a low voltage connection between the luminaire housing and the housing mount. Such modifications may include AC to DC conversion, PWM drivers, smoothing or chopping circuits and the like to provide adequate power to the luminaire. Such electronics may include AC to DC converters, capacitors, and other electronics with voltage and current modification techniques.

As shown in FIGS. 4-6, the electrical power may be provided to the security light 100 via electrical low voltage contacts between the housing mount 102 and luminaire housing 104, thereby allowing the luminaire housing to be electrically connected to the power supply without additional hard wiring. For example, the electrical contact between the first portion 106 of the luminaire housing 104 and the housing mount 102 may be quick connect low voltage electrical contacts. In some implementations, the luminaire housing 104 may rotate relative to the installed orientation of the housing mount 102 allowing the initial orientation of the junction box 3 and/or the housing mount 102 to not limit the orientation of the motion sensor 110 and the lamp head 112. That is to say that the security light 100, in one of the many implementations, is electrically coupled regardless of the rotational orientation between the luminaire housing 104 relative to the housing mount 102.

In implementations, the electrical connection between the housing mount 102 and luminaire housing 104 may, in some implementations, include ground, neutral, and hot connections if not utilizing a transformer. In other implementations, the voltage into the housing mount 102 may be converted by transformer or other electronic mechanisms to low voltage and the connection between the housing mount and luminaire housing may be low voltage DC+ and DC−. In some implementations, these connections may be maintained for rotation about an axis A as shown in FIGS. 4 and 6. In some installations, the luminaire housing 104 of the security light 100 initially attaches to the housing mount 102 at an offset angle between the two structures allowing rotation to be a part of the installation process. For example, installation may require rotation of the luminaire housing relative to the housing mount 102 by 20-40 degrees before the two structures are in a final locked orientation. In still further examples, there may be a direct connection between the housing mount 102 and the luminaire housing 104, which does not require rotational adjustment. For example, the luminaire housing 104 may snap fit, friction fit or be installed in the proper orientation to the housing mount 102. In still further implementations, no rotation between the luminaire housing and the housing mount may be required.

Figure 5B:
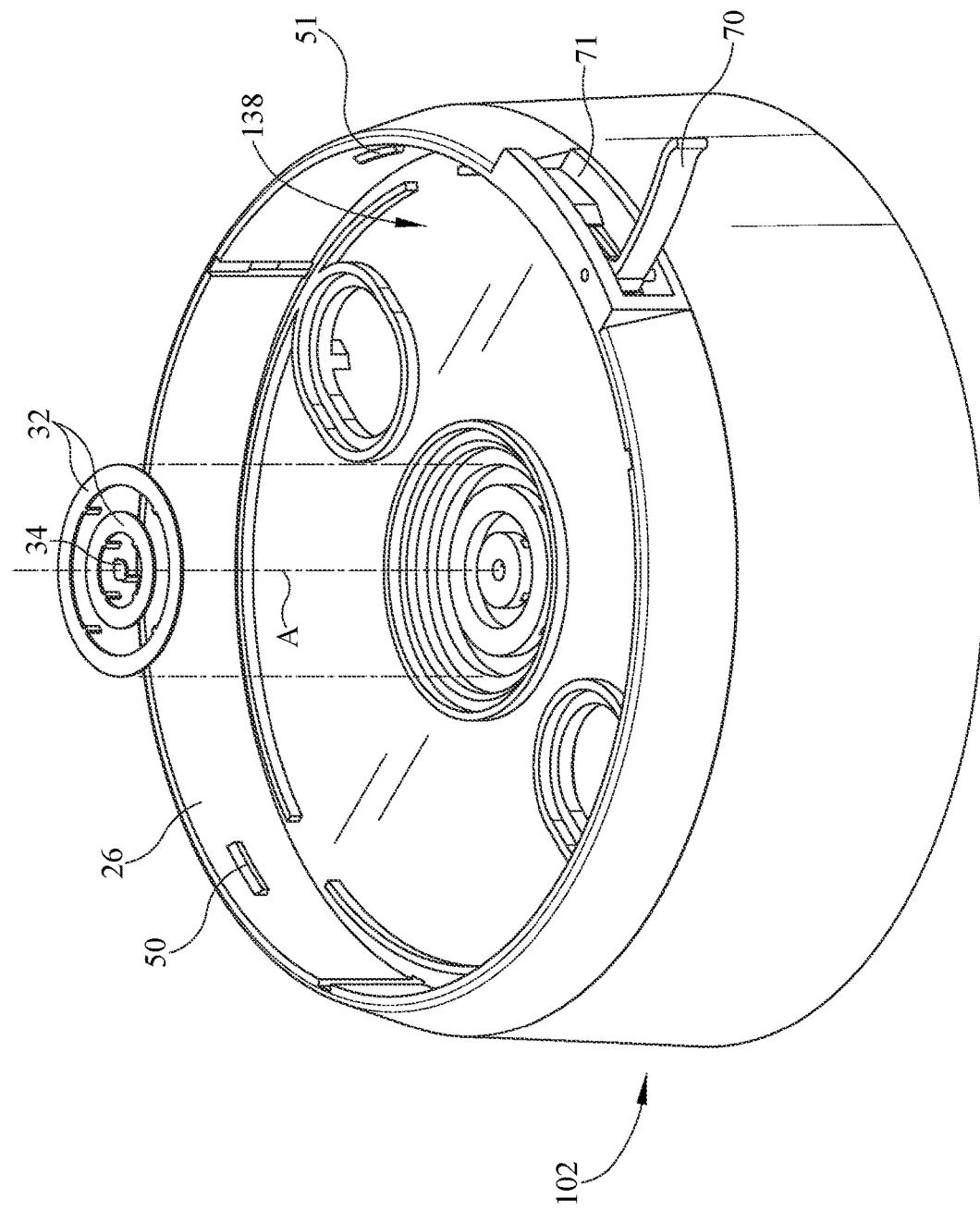
FIG. 5B is a front view of the mount housing mounting plate, according to an embodiment of the present disclosure.

In some embodiments, the rotational electrical contacts between the housing mount 102 and the luminaire housing 104 may be concentric contacts located on respective receiving interfacing surfaces of the two components. When the two components are in a mounted contacting position, the contacts may be aligned to corresponding opposing contacts on the receiving surface, allowing the power to be exchanged between the contacts. As shown in FIGS. 4-6, electrical contacts or connections 32, 22 between the housing mount 102 and the luminaire housing 104 may be rotatably electrically engaged during the rotation (e.g. in the plurality of rotational orientations of the luminaire housing 104 in respect to the housing mount 102). The one or more electrical contacts 22 of the luminaire housing 104 (as shown in FIGS. 5A and 6) may have rotational contact with the one or more respective electrical contacts 32 of the housing mount 102 (as shown in FIGS. 4 and 5B). The one or more electrical contacts 22 of the luminaire housing 104 rotates with the luminaire housing 104 and maintains the contact (e.g. axial and/or radial contact, etc. for 360 degrees contact about the axis A) with the fixed connections 32 of the housing mount 102. Stated alternatively, the one or more engaging contacts 22 may be rotationally held in electrical contact with the other corresponding contacts 32 at the housing mount 102 during any point of the rotation. Thus, in some embodiments, the rotatable luminaire housing 104 may be in rotational connection with the housing mount 102 wherein electrical connectivity between the light luminaire housing 104 and the housing mount 102 is maintained during all points of rotation. In other embodiments, rotational connectivity may be maintained only during a predefined rotational extent wherein the luminaire housing 104 is energized at recognized rotational points relative to the housing mount 102 while at other points during the rotational extent relative to the two the electrical connections may be interrupted. Similar aspects and features may be implemented in a rotatable electrical plug connection as well.

Some implementations may not require rotational electrical implementation. For example, a first orientation between the housing mount 102 and the luminaire housing 104 is supported whereby electrical connection is achieved through mechanical connection of the two structures. For example, an electrical plug configuration can be utilized allowing for electrical connectivity.

In the embodiment shown in FIGS. 4-6, the luminaire housing 104 may include a first and second rearwardly projecting electrical contacts 22 in a tensioned leaf spring or brush configuration, engaging the electrical contacts 32 in a concentric annular ring configuration (e.g. DC positive and DC negative) of wall 138 of the housing mount 102. The contacts may include a centrally located coil spring 24 for ground or other control signals with a corresponding centrally located disc 34 of the housing mount 102. Both contacts 24, 34 can act as either a ground connection/contact or may also be utilized as an alternative "other sensing" feature for manual over-ride functionality. In such embodiments, the first and second rearwardly projecting electrical contact 22 may maintain electrical connectivity to the energized concentric annular rings 32 during the entire rotational extent of the luminaire housing 104 relative to the housing mount 102 while the rings 32 are continually in electrical connectivity to respective wirings from the transformer.

As depicted in the example of FIG. 5B, the annular contact rings 32 and disc 34, which are on the secondary side of the transformer for low voltage conversion, may be electrically connected to respective DC positive and DC negative connections from the transformer after conversion from line voltage to low voltage. Upon installation of the luminaire housing 104 onto the housing mount 102, the first and second rearwardly projecting electrical contacts 22 may engage the respective annular ring 32 and thereby be electrically connected to the respective line of the junction box 3 without the user having to directly wire the light fixture. The spring 24 or other similar engagement surface, tab, contact or spring can be electrically connected to the disc 34. The first and second rearwardly projecting electrical contact 22 and the spring 24 for example as depicted in the embodiments here, could allow for not only continued engagement around a rotational extent of engagement between the structures but also elevational differences thereby maintaining electrical connectivity at differing connection heights between the luminaire housing 104 onto the housing mount 102.

In various constructions, as shown in FIG. 5B, the plurality of rings 32 of the housing mount 102 may be installed within a corresponding number of annular extending grooves formed within the base to fixedly retain the rings therein. Further, the disc 34 may be centrally positioned within the annular grooves and the annular rings within a recess formed in the housing mount 102. The recess and annular grooves form a mechanism to positionally retain both the annular rings 32 and the contacts from the luminaire within the housing mount 102.

In some embodiments, one or more structures of the luminaire housing 104 and/or the housing mount 102 may axially and/or rotationally engage each other to allow relative rotation and/or energizing of the security light 100. Alternatively, or in combination with the light fixture structure, the user may need to axially and/or rotationally maintain the luminaire housing 104 with the housing mount 102 until the rotational orientation is fixed. For example, with the luminaire housing 104 assembled with the housing mount 102, the electrical contacts 22, 32 may be engaged/energized. In some embodiments as shown in FIGS. 4 and 5B, one or more retention members 50 (e.g. lugs, taps, projections, dimples) may be used to axially retain the luminaire housing 104 with the housing mount 102. The retention member 50 may also allow for relative rotation between the luminaire housing 104 and the housing mount 102. The retention member 50 may be received within one or more receivers 60 located on a skirt 27 of the luminaire housing 104.

In the embodiment shown in FIG. 4, the housing mount 102 may include one or more retention members 50 project inwardly from the receiving collar 26 of the housing mount 102. The one or more retention members 50 engage the receiver 60 thereby locking the housing mount 102 and the luminaire housing 104. This may allow the user to have hands free retention until rotation or other mechanical connection of the luminaire housing 104 is needed, if any. The one or more retention members 50 may travel 360 degrees or a portion thereof within the receiver 60 and allowing the rotation of the luminaire housing 104 relative to the housing mount 102. Although the receiver 60 may be a continuous groove about the outer periphery of the skirt 27 of the luminaire housing 104, it should be understood that the receiver 60 may be a variety of constructions including variations in sizes, locations and shapes.

In some embodiments, the luminaire housing 104 may be secured in at least one orientation relative to the housing mount 102. A mechanical locking structure/mechanism 70 may be used to retain the luminaire housing 104 within the housing mount 102 or vice versa. For example, any structure outlined may be swapped in position between the two structures so that the interference fit or retention is maintained. For example, a cam lock or latch 70 may be used to lock or fix the position between the two structures. When in a disengaged position as shown in FIG. 4, the locking mechanism 70 (e.g. a cam lock/latch) allows the luminaire housing 104 to rotate about the axis A. Although the cam lock 70 is shown in the embodiments, it should be understood that a variety of one or more locking mechanisms may be used to fix the position between the luminaire housing 104 and the housing mount 102. The locking mechanism 70 may include, for example, geometric coupling (e.g., dovetails, tongue-and-grooves, pin-and-slots, etc.), and fasteners of many types (e.g., screws, bolts, rivets, pins, ball detents, spring retainers, etc.). For example, in some embodiments, screws which enter into the side of the fixture and which contact the housing mount 102 to maintain relative position between the luminaire housing 104 and the housing mount 102 may be utilized. As well, for example, rotational stop-locks with threads engaging between the two structures, engagement lugs which engage at specific rotational positions, push and turn engagement structures between the between the luminaire housing 104 and the housing mount 102 may also varyingly be implemented.

In some embodiments, the rotational locking mechanism 70 and the one or more retention members 50 may axial secure the luminaire housing 104 with the housing mount 102. The one or more retention members 50 may releasable engage (e.g. axial disengagement) from the annular groove allowing replacements, repair, or attaching a different style fixture housing, etc. Further, in some embodiments, the one or more retention members 50 may allow the user to identify that the engagement (e.g. axial) between the housing mount 102 and luminaire housing 104 has been reached and/or disengaged by creating a characteristic identified by the user such as, but is not limited to, an audible click, visual identification, feel, marked rotational position identifiers, etc. Although the retention members are shown as an arcuate projecting tab and the annular groove is shown with an arcuate profile, it should be understood that the retention member/groove may be different in shape, size, quantity, position, and construction. Moreover, for example, the axial/rotational structural engagement may be incorporated in either housing/base. Further, implementation without retention members can be achieved. For example, a friction fit and other locking structure can be implemented. For example, the diameter of the collar can be similar but slightly larger than the skirt 27 allowing the skirt to be frictionally received into the collar.

For example, in some other embodiments, the rotational locking mechanism 70 may be used, alone or in combination with other structure (e.g. the retention member 50), to axially and/or rotationally fix the luminaire housing 104 to housing mount 102. For example, the one or more rotational locks 70 may partially be inserted into an annular groove 71 in the outer periphery of the skirt 27 of the housing mount 102 allowing axial retention. The retention is maintained while also being able to rotate of the luminaire housing 104 until the user decides to fully engage the rotational locking mechanism 70 to fix the rotational orientation. If no retention members are used, one or more rotational locks may be used alone to lock the axial and rotational position of the luminaire housing 104.

In some embodiments, the one or more retention members 50 may include one or more different retention members 51. The one or more retention members may be different in shape, size, quantity, position, and construction. For example, as shown in FIG. 4, the retention members may include at least two separate retention members 50 and 51 to aid in separation/engagement of the luminaire housing 104 with the housing mount 102. Alternatively, a first retention member 50 may be considered a "hard stop" and a second retention member 51 may be considered a "soft stop". The second retention member 51 may maintain axial rotation/axial engagement but allow for removal/attachment to the groove. The first retention member 50 may be used in combination with the rotational locking mechanism 70 to secure the rotational position and/or engage the sealing function of the one or more gaskets 80 and/or maintain axial rotation/axial engagement. The second retention member 51 may assist the user in removing/attaching the luminaire housing 104 from the axial and/or rotational engagement. For example, the first retention member 50 may be unable to disengage from the receiver 60 unless the second retention member 51 disengages first. Further in some embodiments, the first retention member 50 may need to be axial engaged with the receiver 60 first before the second retention member 51. In some embodiments, the second retention member 51 may require less axial removal force than the first retention member. As shown in the embodiments in FIGS. 4 and 5B, the first retention member 50 may be positioned on an opposing side of the locking mechanism 70. This may balance the forces to secure the engagement between the luminaire housing 104 and the housing mount 102. It should be understood that the one or more first and/or second retention members may be in a variety of locations, shapes, sizes, constructions, and quantities.

The motion sensor 110 may incorporate the use of multiple or single mounted passive infrared sensor (PIR), pyro-electric infrared radial (PR) sensor, radar, sonic and/or laser range finding, among various technologies known to electronically determine movement of people and/or animals. For example, in some embodiments, the motion sensor 110 may be a capacitive sensor that utilizes a heatsink of the security light 100 and/or a transparent patch of indium tin oxide (ITO) on an outer surface of security light 100 as a key. Also, for example, in some embodiments, the motion sensor 110 may be an ultra-sonic Doppler transmitter and receiver that uses time of flight techniques to determine distance to an object. Also, for example, in some embodiments, the motion sensor 110 may be a radar transmitter and receiver that uses time of flight techniques to determine distance to an object or may be a video camera. Also, for example, in some embodiments, the motion sensor 110 may be an infra-red reflection distance sensor receiver that measures distance to an object. Also, for example, in some embodiments, the motion sensor 110 may be a PIR that detects a heat source (such as a user's hand). Also, for example, in some embodiments, the motion sensor 110 may be light reflection sensor that detects presence and/or distance of an object based on reflections of light output of the security light 100. Also, for example, in some embodiments, the motion sensor 110 may be a camera and one or more signals from the camera may be utilized to detect presence and/or distance of an object. For example, signals from a depth camera may be utilized to determine an object in the shape of a person or vehicle is approaching. Also, for example, signals from a camera may be utilized to determine movement and the movement may be assumed or determined to be human movement. Also, for example, signals from a camera may be utilized to determine presence of a heart beat for example, by monitoring changes in reflected light from a hand and/or other body part of a user. In some embodiments a proximity sensor may include one or more controllers to determine presence, distance, and/or other values.

The motion sensor 110 may be affixed directly to the luminaire housing 104 or may be remote therefrom and may be connected to the security light 100 either by a wired or a wireless connection. For example, the motion sensor 110 may communicate with the security light 100 from a remote location and provide a signal indicating detected motion. Such technology may include heat signatures, range finding and/or distance measurement algorithms and other techniques which may be electronically implemented in the motion sensor 110, combined with electronics within the luminaire housing 104.

In some embodiments, the motion sensor 110 may also include a motion sensor lens 132 to protect electronics inside, and through which the motion sensor 110 can detect motion. The motion sensor lens 132 may be a transparent or translucent bulb type housing. For example, the motion sensor lens 132 may be a Fresnel lens and/or other similar structures to focus light and/or radiation to the opening allowing input to the senor electronics. Motion sensor 110 may also include shroud 124 which defines the outward sight lines of the motion sensors interior to and behind the lens 132. For example, the shroud 124 has a larger aperture portion alongside or peripheral extremes and narrows the upper and lower field of view. Such shroud 124 may incorporate such sections, e.g. narrowing upper and lower extremes and widening peripheral extremes, to increase range, removing extraneous input and improve range.

Besides the motion sensor 110, in some embodiments, the security light 100 may incorporate additional sensing devices such as a light (optical) sensor to determine ambient light levels, allowing the associated lamp head 112 to come on at dusk (e.g., enabling the dusk to dawn (D2D) mode as shown in FIG. 8). For example, a light sensor such as a photodiode with fully operational light sensing electronics may be located on the luminaire housing 104. The light sensor may also be combined with other location finding techniques to determine location and time zone and correlating location with pre-determined or calculated sunset and sunrise times. For example, upon access to an internet connection, a wireless communication module 202 could obtain location information and also automatic sunset and sunrise information daily for such location. Alternatively, the lighting controller may have associated electronics and memory to allow programming of customer/installed desired on/off times after dusk, illumination ON times after sensing motion, full dusk to dawn illumination, partial or lower light intensity dusk to dawn illumination for the entire period or for user defined periods, modification of intensity levels, or other customer desirable modifications. Further, the lighting controller may further be configured to sense a hard 'reset' or active 'on' by manual switching off then on of the power at the switch by the user. All of such features may be incorporated into the lighting controller programming where a microprocessor executes instructions stored in an associated memory, or in alternative or combined configurations, some or all features may be implemented with associated circuit controls incorporated into the controller. The light sensor may be a photocell, such as a light dependent resistor or photo resistor or a photocell, however other types of light sensors may also be used.

It should be understood that duty cycle modification, frequency modulation, or other modulation schemes and control functions may be utilized in such embodiments for purposes of modifying the intensity level of the illumination and pulse width modulation to save energy. Further, other power usage functionality may be implemented such as reducing the modulation frequency of the lamp head 112 once certain voltage levels are reached, modifying the light output or other characteristics, reading ambient temperature characteristics to modify charging cycles and the like.

In some embodiments, it may be desirable to allow the user to reprogram the associated control parameters of the security light 100. Such modification can include the delay times and sensitivity for triggering of the motion sensor 110, the light intensity levels, color, color temperature, and color sensitivity for triggering of the light sensor, as well as other control parameters such as on times and lower illumination times and/or levels. Such reprograming may be implemented through the security light 100 user input switches or dials as well as through wireless communications.

As shown in FIG. 8, a control panel 140 for the security light 100 may be located on the luminaire housing 104 and allow for a first and a second user input 142, 144. In some embodiments, the control panel 140 may be located elsewhere on the security light 100, or the control panel 140 may be located remotely from the security light 100. The control panel 140 may include a variety of controls to allow a user to make adjustments to the operation of the security light 100. In the illustrated embodiment as shown only as one example in FIG. 8, the control panel 140 may include a timer adjustment 142, a brightness adjuster 144, and/or a solar panel connection port 146. The timer adjustment 142 allows a user to adjust how long the lamp head 112 should remain illuminated once motion has been detected by the motion sensor 110. The brightness adjustment 146 user input allows a user to adjust the light level of the one or more lamp head 112. The test mode may allow a user to walk around and adjust the motion sensor 110 to the desired position. The D2D mode places the security light 100 in an "ON" state from sundown to sunrise. It should be understood that alternative control panel layouts, configurations, and controls are possible. For example, in some embodiments, the security light 100 may have one or more color-changing lamp heads 112, and the control panel 140 may also include controls for allowing a user to set the color of light being emitted. In some other embodiments, user specified alternative modifications may further include flashing or blinking lights of each or all lamp heads 112 under predefined conditions. For example, in some embodiments, one or more lamp heads 112 may be programmed via the control panel 140 to flash intermittently to indicate an alert or warning condition, such as the detected interruption of power. Alternatively, a flashing alert or warning condition may be implemented by programming or user adjustment of controls by one or more light panels upon detection of motion while concurrently increasing illumination intensity of one or more lamp heads 112.

It should be also understood that such programming capability may also be implemented by a user through a mobile programming device, such as a phone or dedicated remote control, and a communication channel may be utilized for both transmission and receiving commands from the remote source or server or directly from the user device. Corresponding applications may be implemented for modification of such features on a user mobile device. For example, a user may select and/or modify ON time after the motion sensor 110 detects motion while also selecting the illumination intensity, such as dimming the illumination levels slowly during change in state. In alternative embodiments, the user may select and/or modify the specific colors utilized by the lamp head 112, if supported, and may include user modification of the color temperature. Such modifications may be implemented either for of each or all lamp heads 112.

As stated previously, in some embodiments, the security light 100 may include one or more electrical components such as the controller 200, transformers, and other electronics. For example, in some embodiments, various electronics such as wireless communication modules 202 allow remote control of the security light. In such examples, a Wi-Fi, blue tooth, ZigBee, or other short-range communication protocols may be implemented with supporting electronics as part of a wireless communication strategy. Modification of light output characteristics may be implemented by modulation techniques including pulse width modulation, frequency modulation, amplitude modulation, embedded pulse code modulation for data inclusion, as well as others and combinations thereof. The controller and/or driver for the security light 100 may be integrated into a single electronic circuit and/or control processor are not necessarily required to be separated or integrated as either may be implemented, alone or in a combined configuration to control the light output of the lamp head 112. The respective modulated pulses from the driver, drivers, and/or controllers as well as possibly the baseline currents output by the driver circuits may be independently controlled by higher level logic of a system controller. In a digital controller example, such logic may be implemented by a programmable microcontroller, although those skilled in the art will recognize that the logic could take other forms, such as discrete logic components, an application specific integrated circuit (ASIC), etc. Additionally, and/or alternatively, the security light 100 may be configured to operate at pre-programmed or pre-scheduled times.

In some embodiments, the security light 100 may also include a wireless communication module 202. The communication module may allow communication with other devices (e.g., a Wi-Fi router) to establish a wired or a wireless connection according to various communication standards (e.g., Ethernet, Wi-Fi, Bluetooth, or ZigBee) between the security light 100 and a remote device (e.g., a smart phone, server, etc.). In some embodiments, the communication module may be located in the luminaire housing 104 and/or the housing mount 102. In some embodiments, the communication module may be in a separate location from the security light 100. For example, the communication module may be located remotely connected by wire or wirelessly to the security light 100 and other electronics. The communication module may be, for example, a Wi-Fi microchip with full TCP/IP stack and microcontroller capability. The communication module may allow the controller 200 to connect to the internet and make simple TCP/IP connections using Hayes-style commands. The communication module may also allow the security light 100 to transmit data through the internet to various servers or other devices. In some implementations, the light 100 may be controlled and or modified by the same services or other devices.

In various embodiments, the communication module and the controller 200 may be integrated. For example, the controller 200 may be provided with processing capabilities and also include an embedded wireless controller chip. In still further examples, multiple electronic elements may be integrated or separated. For example, a lighting controller may be integrated with communications module into a single chip.

It should be understood that various control functions may be achieved with the help of the communication module. For example, a user may use a smart phone to communicate to the security light 100 using the communication module to select and/or modify ON time after the motion sensor 110 detects motion while also selecting the illumination intensity, such as dimming the illumination levels slowly during change in state. In alternative embodiments, the user may use the smart phone to communicate to the security light 100 using the communication module to select and/or modify the specific colors utilized by the associated light fixtures, if supported, may also select and/or modify the color temperature.

It is to be understood that a rotationally adjustable outdoor security light disclosed here is not limited in its application to the details of construction and the arrangement of components set forth in the following description or illustrated in the drawings. The described embodiments are capable of other embodiments and of being practiced or of being carried out in various ways. That is, the structure of the rotationally adjustable outdoor security light as shown here is presented for purpose of illustration and description only. It is understood that numerous modifications and alterations of the structure of the rotationally adjustable outdoor security light may be made while retaining the teachings of the present disclosure. Consequently, the disclosed rotationally adjustable outdoor security light may be installed in various environments. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to direct physical or mechanical connections or couplings. It should be understood that the rotationally adjustable mechanism could vary greatly and still accomplish the same intent. The elements depicted in the accompanying figures may include additional components and that some of the components described in those figures may be removed and/or modified without departing from scopes of the elements disclosed herein. The elements depicted in the figures may not be drawn to scale and thus, the elements may have different sizes and/or configurations other than as shown in the figures.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed.

Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03. It should be understood that certain expressions and reference signs used in the claims pursuant to Rule 6.2(b) of the Patent Cooperation Treaty ("PCT") do not limit the scope.

What is claimed is:

1. A method for controlling an outdoor security light connected to multiple electrical sources, comprising:
    a luminaire housing having at least one luminaire lamp head adjustably connected to the luminaire housing, the at least one luminaire lamp head having a plurality of illumination sources;
    an illumination controller electrically connected to a first electrical supply input, a second electrical supply input and a third electrical supply input and operable to detect an electrical characteristic at each of the first electrical supply input, second electrical supply input and third electrical supply input;
    the illumination controller controlling at least one illumination characteristic of the luminaire lamp head plurality of illumination sources;
    a motion detection sensor electrically connected to the illumination controller;
    the illumination controller connected to an associated memory, the associated memory storing an electrical connectivity priority list which is accessible by the illumination controller and which contains at least:
        a first, second and third priority electrical connection between the first electrical supply input, second electrical supply input and the third electrical supply input;
        for each of the first, second and third priority electrical connection, an associated light output illumination level for detected motion from the motion detection sensor;
    detecting by the illumination controller the electrical characteristic from at least one of the first electrical supply input, second electrical supply input and third electrical supply input;
    selecting by the illumination controller one of the first electrical supply input, second electrical supply input and third electrical supply input based upon:
        the detected characteristic of at least one of the first electrical supply input, second electrical supply input and third electrical supply input, and
        the electrical connectivity priority list;
    selectively connecting by the illumination controller the motion detection sensor to the selected one of the plurality of the first electrical supply input, second electrical supply input and third electrical supply input based upon:
        detecting by the motion detection sensor a motion signal;
        illuminating by the illumination controller the plurality of illumination sources of the at least one luminaire lamp head by the selected one of the plurality of the first electrical supply input, second electrical supply input and third electrical supply input at the associated light output illumination level for the selected electrical supply input.

2. The method of claim 1 wherein the detecting by the illumination controller the electrical characteristic from at least one of the first electrical supply input, second electrical supply input and third electrical supply input detects at least one of voltage and current.

3. The method of claim 2 wherein the detecting by the illumination controller the electrical characteristic from at least one of the first electrical supply input, second electrical supply input and third electrical supply input, includes:
    detecting each of the first electrical supply input, second electrical supply input and third electrical supply input in a predetermined electrical selectivity order;
    determining if detected first electrical supply input, second electrical supply input and third electrical supply input meets a predetermined threshold;
    discontinuing the detecting once one of the detected first electrical supply input, second electrical supply input and third electrical supply input meets a predetermined threshold.

4. The method of claim 3 further including discontinuing the illuminating by the illumination controller of the at least one luminaire lamp head after a predetermined time period.

5. The method of claim 4 wherein the predetermined time period for illuminating of the at least one luminaire lamp head is associated with the associated light output illumination level.

6. A method of controlling an outdoor security light, comprising:
    sensing, by an illumination controller, an electrical characteristic at a first electrical source input, a second electrical source input and a third electrical source input;
    based upon the sensed electrical characteristic, connecting one of the first electrical source input, the second electrical source input and the third electrical source input, to a plurality of LEDs in at least one lamp head of the security light;
    wherein the first electrical source input is electrically connected to a line voltage input, the second electrical source input is connected to a remote solar charging station having a rechargeable battery, and the third electrical source input is electrically connected to a local battery source;
    wherein the connecting one of the first electrical source input, the second electrical source input and the third electrical source input, to the plurality of LEDs in the at least one lamp head of the security light is based upon an electrical connectivity priority list stored in memory associated with the outdoor security light.

7. The method of claim 6 wherein the sensing of the electrical characteristic is at least sensing a first voltage at the first electrical source input.

8. The method of claim 7 wherein the sensing of the electrical characteristic further includes sensing a second voltage at the second electrical source input and sensing a third voltage at the third electrical source input.

9. The method of claim 6 wherein the sensing of the electrical characteristic includes detecting at least one of voltage or current.

10. The method of claim 8 further comprising prioritizing the connecting to the plurality of LEDs.

11. The method of claim 10 wherein the prioritizing the connecting further includes:
connecting the first electrical source input to the plurality of LEDs when the sensed first voltage is at least a predetermined minimum voltage.

12. The method of claim 11 further comprising
when the sensed first voltage is not at least a predetermined minimum voltage, determining if the sensed second voltage is at least a second predetermined voltage;
when the sensed second voltage is at least a second predetermined voltage, connecting the second electrical source input to the plurality of LEDs.

13. The method of claim 12 further comprising
when the sensed second voltage is not at least a second predetermined minimum voltage, determining if the sensed third voltage is at least a third predetermined voltage;
when the sensed third voltage is at least a third predetermined voltage, connecting the third electrical source input to the plurality of LEDs.

14. The method of claim 10 further comprising setting a predetermined intensity for the plurality of LEDs based on the prioritizing the connecting.

15. A method of controlling an outdoor security light, comprising:
providing a first electrical source input, a second electrical source input and a third electrical source input in the outdoor security light;
wherein the first electrical source input is electrically connectable to a line voltage input, the second electrical source input is connectable to a remote solar charging station having a rechargeable battery, and the third electrical source input is electrically connected to a local battery source;
sensing, by an illumination controller, an electrical characteristic at the first electrical source input, the second electrical source input and the third electrical source input;
based upon the sensed electrical characteristic, determining a priority of connections between the first electrical source input, the second electrical source input and the third electrical source input;
wherein the determining of the priority of connections further includes at least associated electrical priority circuitry;
connecting one of the first electrical source input, the second electrical source input and the third electrical source input, to a plurality of LEDs in at least one lamp head of the security light based upon the determined priority of connections.

16. A method of controlling an outdoor security light, comprising:
providing a first electrical source input, a second electrical source input and a third electrical source input in the outdoor security light;
wherein the first electrical source input is electrically connectable to a line voltage input, the second electrical source input is connectable to a remote solar charging station having a rechargeable battery, and the third electrical source input is electrically connected to a local battery source;
sensing an electrical characteristic at the first electrical source input, the second electrical source input and the third electrical source input;
determining a connection priority between the first electrical source input, the second electrical source input and the third electrical source input;
connecting one of the first electrical source input, the second electrical source input and the third electrical source input, to a plurality of LEDs in at least one lamp head of the security light based upon the determined priority of connections.

17. An outdoor security light with multiple power sources, comprising:
a luminaire housing having at least one luminaire lamp head, the at least one luminaire lamp head adjustably connected to the luminaire housing, the at least one luminaire lamp head having a plurality of LEDs;
an illumination controller electrically connected to a first electrical supply input, a second electrical supply input and a third electrical supply input and operable to detect an electrical characteristic at each of the first electrical supply input, second electrical supply input and third electrical supply input;
the illumination controller operable to control at least one illumination characteristic of the luminaire lamp head plurality of LEDs;
the first electrical supply input connected to a line voltage power line, the second electrical supply input connected to a rechargeable battery connected to a photovoltaic cell and the third electrical supply input connected to at least one backup battery retained within the luminaire housing;
the illumination controller connected to an associated memory, the associated memory storing an electrical connectivity priority list which is accessible by the illumination controller and which contains at least:
a first, second and third priority electrical connection between the first electrical supply input, second electrical supply input and the third electrical supply input;
for each of the first, second and third priority electrical connection, an associated light output illumination level for motion;
the illumination controller operable to select a selected electrical input to connect to the plurality of LEDs of the at least one luminaire lamp head, one of the first electrical supply input, second electrical supply input and third electrical supply input based upon:
the detected characteristic of at least one of the first electrical supply input, second electrical supply input and third electrical supply input, and
the electrical connectivity priority list;
the illumination controller, upon receipt of a motion detect signal, operative to:
selectively connect the selected electrical input selected from the first electrical supply input, the second electrical supply input and the third electrical supply input, to the plurality of LEDs of the at least one luminaire lamp head;
adjust the illumination level of the plurality of LEDs of the at least one luminaire lamp head to the associated light output illumination level for motion stored in the electrical connectivity priority list.

18. The security light of claim 17 wherein the electrical connectivity priority list is stored in the associated memory accessible to the illumination controller within the outdoor security light.

19. The security light of claim 17 further including a remote server in electronic communication with the illumination controller of the outdoor security light, wherein the electrical connectivity priority list is communicated to the illumination controller from the remote server.

20. The security light of claim 17 wherein the electrical connectivity priority list further includes:
for each of the first, second and third priority electrical connection, the associated light output illumination level for:
non-motion and
a motion on-duration value representing a time amount the at least one luminaire lamp head is illuminated upon detection of motion.

21. The security light of claim 17 wherein the security light further includes a user input panel, the user input panel providing an over-ride selection for illumination intensity, the over-ride selection for illumination intensity read by the illumination controller and replacing at least one of the first, second and third priority electrical connections associated light output illumination level for motion.

22. The security light of claim 17 wherein the illumination controller, after selectively connecting the plurality of LEDs of the at least one luminaire lamp head to one of the first electrical supply input, second electrical supply input and third electrical supply input, is operable to continue to detect the detected characteristic of at least one of the first electrical supply input, second electrical supply input and third electrical supply input.

23. The security light of claim 17 wherein the illumination controller, after selectively connecting the plurality of LEDs of the at least one luminaire lamp head to one of the first electrical supply input, second electrical supply input and third electrical supply input, continues to detect the detected characteristic of each of the first electrical supply input, second electrical supply input and third electrical supply input.

24. The security light of claim 23 wherein
the illumination controller configured to selectively disconnect and re-connect the plurality of LEDs of the at least one luminaire lamp head to one of the first electrical supply input, second electrical supply input and third electrical supply input based upon:
the detected characteristic of at least one of the first electrical supply input, second electrical supply input and third electrical supply input, and
the electrical connectivity priority list.

25. The security light of claim 24 wherein the illumination controller's selective re-connection of the at least one luminaire lamp head includes modification of the associated light output illumination level for motion.

26. The security light of claim 17 wherein the detected electrical characteristic is voltage.

27. The security light of claim 26 wherein the illumination controller is connected to at least one switch operable to connect the plurality of LEDs of the at least one luminaire lamp head to one of the first electrical supply input, second electrical supply input and third electrical supply input.

28. An outdoor security light with multiple power sources, comprising:
a luminaire housing having at least one luminaire lamp head adjustably connected to the luminaire housing, the at least one luminaire lamp head having a plurality of illumination sources;
an illumination controller electrically connected to a first electrical supply input, a second electrical supply input and a third electrical supply input and operable to detect an electrical characteristic at each of the first electrical supply input, second electrical supply input and third electrical supply input;
the illumination controller operable to control at least one illumination characteristic of the luminaire lamp head plurality of illumination sources;
a motion detection sensor electrically connected to the illumination controller;
the illumination controller connected to an associated memory, the associated memory storing an electrical connectivity priority list which is accessible by the illumination controller and which contains at least:
a first, second and third priority electrical connection between the first electrical supply input, second electrical supply input and the third electrical supply input;
for each of the first, second and third priority electrical connection, an associated light output illumination level for detected motion from the motion detection sensor;
the illumination controller operable to selectively connect the plurality of illumination sources of the at least one luminaire lamp head to one of the first electrical supply input, second electrical supply input and third electrical supply input based upon:
the detected characteristic of at least one of the first electrical supply input, second electrical supply input and third electrical supply input;
a received motion detect signal from the motion detection sensor; and
the electrical connectivity priority list.

29. An outdoor security light with multiple power sources, comprising:
a luminaire housing having at least one luminaire lamp head adjustably connected to the luminaire housing, the at least one luminaire lamp head having a plurality of illumination sources;
an illumination controller electrically connected to a first electrical supply input, a second electrical supply input and a third electrical supply input and operable to detect an electrical characteristic at each of the first electrical supply input, second electrical supply input and third electrical supply input;
the illumination controller operable to control at least one illumination characteristic of the luminaire lamp head plurality of illumination sources;
a motion detection sensor electrically connected to the illumination controller;
the illumination controller connected to an associated priority circuitry, the associated priority circuitry setting an electrical connectivity priority which is accessible by the illumination controller and which contains at least:
a first, second and third priority electrical connection between the first electrical supply input, second electrical supply input and the third electrical supply input; and
for each of the first, second and third priority electrical connection, an associated light output illumination level for detected motion from the motion detection sensor;
the illumination controller operable to selectively connect the plurality of illumination sources of the at least one luminaire lamp head to one of the first electrical supply input, second electrical supply input and third electrical supply input based upon:

the detected characteristic of at least one of the first electrical supply input, second electrical supply input and third electrical supply input;
a received motion detect signal from the motion detection sensor; and
an electrical connectivity priority list.

30. The outdoor security light of claim 29 wherein the associated priority circuitry includes at least one switch setting.

\* \* \* \* \*